US012162561B2

(12) United States Patent
Praveen et al.

(10) Patent No.: US 12,162,561 B2
(45) Date of Patent: Dec. 10, 2024

(54) CARGO-CARRYING WHEELED VEHICLE

(71) Applicants: Vijay K Praveen, Bangalore (IN); Alok Das, Pune (IN)

(72) Inventors: Vijay K Praveen, Bangalore (IN); Alok Das, Kharadi (IN); Lakshmish Gangadhar, Bangalore (IN); Nitin Ranade, Bavdhan (IN)

( * ) Notice: Subject to any disclaimer, the term of this patent is extended or adjusted under 35 U.S.C. 154(b) by 551 days.

(21) Appl. No.: 17/435,079

(22) PCT Filed: Mar. 2, 2020

(86) PCT No.: PCT/IN2020/050192
§ 371 (c)(1),
(2) Date: Aug. 31, 2021

(87) PCT Pub. No.: WO2020/178852
PCT Pub. Date: Sep. 10, 2020

(65) Prior Publication Data
US 2022/0144369 A1 May 12, 2022

(30) Foreign Application Priority Data
Mar. 2, 2019 (IN) .............................. 201941008238

(51) Int. Cl.
| B62K 7/04 | (2006.01) |
| B62J 25/00 | (2020.01) |
| B62J 43/28 | (2020.01) |
| B62J 45/415 | (2020.01) |
| B62K 3/06 | (2006.01) |
| B62K 21/04 | (2006.01) |
| B62K 21/18 | (2006.01) |
| B62K 25/08 | (2006.01) |
| B62K 25/28 | (2006.01) |

(52) U.S. Cl.
CPC ................. B62K 7/04 (2013.01); B62J 25/00 (2013.01); B62J 43/28 (2020.02); B62J 45/415 (2020.02); B62K 3/06 (2013.01); B62K 21/04 (2013.01); B62K 21/18 (2013.01); B62K 25/08 (2013.01); B62K 25/28 (2013.01)

(58) Field of Classification Search
CPC ................................... B62K 3/06; B62K 7/04
See application file for complete search history.

(56) References Cited

U.S. PATENT DOCUMENTS

| 9,428,239 B1 * | 8/2016 | Bell ........................ B62B 7/126 |
| 11,260,928 B2 * | 3/2022 | Taylor .................... B62K 13/08 |

(Continued)

FOREIGN PATENT DOCUMENTS

| CN | 106275182 A | 1/2017 | |
| WO | WO-2018225084 A1 * | 12/2018 | ............. B62K 21/18 |

Primary Examiner — Kevin Hurley
Assistant Examiner — Hosam Shabara
(74) Attorney, Agent, or Firm — Jose Cherson Weissbrot

(57) ABSTRACT

A cargo-carrying wheeled vehicle, said vehicle comprising: at least a cargo hold chassis (10); at least a rider support chassis (20) configured to be operatively behind said cargo hold chassis (10), in that, said cargo hold chassis (10) and said rider support chassis (20) cooperate to maintain centre of gravity of said vehicle, after addition of cargo to said cargo hold chassis (10) and after addition of rider to said rider support chassis (20), to obtain a naturally balanced position for said vehicle in a loaded as well as an unloaded condition.

19 Claims, 29 Drawing Sheets

(56) References Cited

U.S. PATENT DOCUMENTS

| | | | |
|---|---|---|---|
| 2022/0144369 A1* | 5/2022 | Praveen | B62K 3/06 |
| 2022/0161885 A1* | 5/2022 | Praveen | B62K 11/04 |
| 2022/0204120 A1* | 6/2022 | Praveen | B62K 21/04 |
| 2023/0286606 A1* | 9/2023 | Taylor | B62K 7/04 |
| 2023/0339566 A1* | 10/2023 | Praveen | B62J 43/20 |

* cited by examiner

CARGO-CARRYING WHEELED VEHICLE

FIELD OF THE INVENTION

This invention relates to the field of automobiles.

Particularly, this invention relates to a cargo-carrying wheeled vehicle.

BACKGROUND OF THE INVENTION

Freight bicycles, carrier cycles, freight tricycles, cargo bikes, box bikes, or cycle-trucks are human powered vehicles designed and constructed specifically for transporting loads.

Prior art vehicle designs include a cargo area consisting of an open or enclosed box, a flat platform, or a wire basket, usually mounted over one or both wheels, low behind the front wheel, or between parallel wheels at either the front or rear of the vehicle. Typically, this cargo area is randomly placed and does not work well with the vehicle's maneuverability since a variety of moments act on these randomly aligned vehicles; especially while taking turns, causing dangerous as well as difficult maneuvers.

Freight bikes are used in a variety of settings:
Delivery services in dense urban environments;
Food vending in high foot traffic areas (including specialist ice cream bikes);
Transporting trade tools, including around large installations such as power stations and CERN;
Airport cargo handling;
Recycling collections;
Warehouse inventory transportation;
Mail delivery.

These freight bikes are human powered and cannot be used for carrying heavy weight and are also slow due to human effort needed.

Also in all the above examples, the Loading is carried out at higher location, thereby shifting the CG higher which impacts the handling and dynamics of the vehicle.

Furthermore, in all prior art two-wheeled vehicles, there is no dedicated cargo compartment for carrying load. Even if there is, in one type of modified two-wheeled vehicles, the load is at a relatively higher location when considered with the natural centre of gravity of the vehicle (without the modification to carry load), which effectively raises the centre of gravity to a dangerous height making the vehicle (when loaded with rider and load) wobbly and difficult to balance and steer. Additionally, if the load/cargo is kept behind the rider, it almost always rests against the back of the rider, thereby restricting backward movement of the rider and causing tremendous strain on the rider's back. In another type of modified two-wheeled vehicles, the load is at an operative forward location when compared with the rider. This effectively moves the centre of gravity way too ahead with respect to a rider and with respect to the entire loaded vehicles, as a whole, making maneuverability difficult. It is, therefore, important that the centre of gravity be located within a defined zone such that there is no wobbling or misbalancing of the vehicle when it is being ridden, there is ample space for a rider to move his or her body to adjust centre of gravity when riding the vehicle, there is ease of maneuverability, there is no learning curve, and the like.

Therefore, there is a need for a vehicle or a class of vehicle to make cargo carrying, especially, at last mile, easy and efficient, such vehicle or class of vehicle, preferably, being a two-wheeler vehicle.

OBJECTS OF THE INVENTION

An object of the invention is to overcome the current problems involved in freight bikes or cargo scooters.

Another object of the invention is to provide a frame for a cargo scooter which also acts as a load carrying space.

Yet another object of the invention is to maximize the utilization of storage compartment in a freight bike or a cargo scooter.

Still another object of the invention is to provide modularity in the storage compartment, providing channels for installing drawers, in a freight bike or a cargo scooter.

An additional object of the invention is to provide ease of handling of freight bikes or cargo scooters even whilst having a large load carrying space.

Another additional object of the invention is to provide easily maneuverable freight bikes or cargo scooters even whilst having a large load carrying space.

Yet another object of the invention is to provide a rather stable freight bikes or cargo scooters even whilst having a large load carrying space.

SUMMARY OF THE INVENTION

According to this invention, there is provided a cargo-carrying wheeled vehicle, said vehicle comprises:

at least a cargo hold chassis;

at least a rider support chassis configured to be operatively behind said cargo hold chassis, in that, said cargo hold chassis and said rider support chassis cooperate to maintain centre of gravity of said vehicle, after addition of cargo to said cargo hold chassis and after addition of rider to said rider support chassis, to obtain a naturally balanced position for said vehicle in a loaded as well as an unloaded condition, wherein, an operative horizontal spaced apart distance between a centre of gravity of cargo in said cargo hold chassis and a centre of gravity of a rider on said rider support chassis is defined by a first locus of points which lie within two tenths of a wheelbase length and eight tenths of said wheelbase length;

wherein, a combined centre of gravity being formed by a centre of gravity of said cargo in said cargo hold chassis, a centre of gravity of said cargo hold chassis, a centre of gravity of said rider on said rider support chassis, and a centre of gravity of said rider support chassis, characterised in that, said combined centre of gravity being defined by a second locus of points, on an operative horizontal axis of said vehicle, which lie within a first value and a second value, said first value being a tolerance range of one fourth times the wheelbase length added to half the wheelbase length, said second value being a tolerance range of one fourth times the wheelbase length subtracted from half the wheelbase length; and said combined centre of gravity being defined by a third locus of points, on an operative vertical axis of said vehicle, which lie within a third value and a fourth value, said third value being defined by radius of a wheel of said vehicle, said fourth value being defined by radius of a wheel of said vehicle added to a tolerance value of one third the wheelbase length.

Typically, a footrest for a rider to rest their feet is positioned extending from said cargo hold chassis.

In an embodiment, a footrest for said rider is placed operatively ahead of said centre of gravity of said rider and is spaced apart horizontally from said centre of gravity of said rider, said spaced apart distance lying in the range of 0% to 35% of said vehicle's wheelbase length.

In an embodiment, a footrest for said rider is placed operatively behind of said centre of gravity of said rider and is spaced apart horizontally from said centre of gravity of said rider, said spaced apart distance lying in the range of 0% to 35% of said vehicle's wheelbase length.

Typically, said cargo hold chassis is integral with said rider support chassis.

Typically, said cargo hold chassis is located operatively forward and operatively lower with respect to said rider support chassis.

Typically, said cargo hold chassis comprises at least a lateral support member (front and back support member) along with an operative top support member and an operative bottom support member to form a contoured space to hold cargo.

Typically, said cargo hold chassis is communicably coupled with a front wheel or a front set of wheels, the front wheel located on a front axle communicably coupled to a steering mechanism.

Typically, said cargo hold chassis is defined such that an operative front half of said cargo hold chassis is made relatively heavier and an operative rear half of said cargo hold chassis is made relatively lighter for mass centralization.

Typically, said rider support chassis is located operatively rearward with respect to said cargo hold chassis.

Typically, said rider support chassis comprises at least a lateral support member (i.e. front and back support member) along with an operative top support member and an operative bottom support member to form a contoured framework to hold a rider on its top support member.

Typically, said rider support chassis is communicably coupled with a rear wheel or a rear set of wheels, the rear wheel is located on a rear axle.

Typically, said rider support chassis' top support member is located at a height such that the rider, when seated, has his/her individual centre of gravity operatively higher than the individual centre of gravity of cargo load.

Typically, a back lateral support member of said cargo hold chassis and a front lateral support member of said rider support chassis is a single same member.

Typically, a top support member of said cargo hold chassis is greater in length than a top support member of said rider support chassis.

In an embodiment, weight distribution is such that distribution of weight at a front axle varies between 25% and 75% while distribution of weight at a corresponding rear axle varies between 75% and 25%.

In an embodiment, centre of gravity of said vehicle lies in proximity to centre of the wheelbase of the vehicle.

Typically, addition of load in said cargo hold chassis decreases height of centre of gravity of said vehicle; thereby, improving handling and dynamics of said vehicle.

In an embodiment, an operative front wheel of said vehicle is relatively smaller than an operative rear wheel of said vehicle, thereby making said chassis forward bias, thereby increasing weight on said front wheel when cargo is loaded onto said cargo hold chassis which is counterbalanced by the rider load, thereby helping in mass centralization.

In an embodiment, an operative rear wheel of said vehicle is relatively smaller than an operative front wheel of said vehicle, thereby making said chassis rearward bias, thereby increasing weight on said rear wheel, which is counterbalanced when a rider is seated on said rider support chassis and cargo is added onto said cargo hold chassis.

In an embodiment, said vehicle comprising a gyroscope located at the base of said cargo hold chassis to improve handling of the vehicle.

In an embodiment, said vehicle's centre of gravity lies in a pre-defined zone which maintains innate balance of said vehicle irrespective of a rider riding or not, irrespective of cargo loaded or not, said pre-defined zone being defined by a boundary with its front extremities not exceeding internal framework of said cargo hold chassis, with its rear extremities not exceeding hip of a rider riding said rider support chassis, with its upper extremities not exceeding an upper frame of said cargo hold chassis, and with its lower extremities not exceeding a lower frame of said cargo hold chassis.

In an embodiment, said cargo hold chassis being designed to maintain centre of gravity of said vehicle along with said vehicle in a pre-defined zone, in that, front axle weight bearing being greater than 25% while corresponding rear axle weight bearing being lesser than 75%.

In an embodiment, said cargo hold chassis being designed to maintain centre of gravity of said vehicle along with said vehicle in a pre-defined zone, in that, front axle weight bearing being greater than 75% while corresponding rear axle weight bearing being lesser than 25%.

In an embodiment, said cargo hold chassis comprises two steering columns, comprising a first steering column and a second steering column, in its operative front, in that a first steering column defines a rake angle of a front suspension and a second steering column is for translation of steering input to a triple tree.

In an embodiment, said cargo hold chassis comprises two steering columns, comprising a first steering column and a second steering column, in its operative front, in that an intersection of a first axis line along said first steering column and a second axis line along said second steering column defines a point where a universal joint is fixed.

In an embodiment, said cargo hold chassis comprises a cargo triangle, where centre of gravity of cargo lies in said cargo triangle, said cargo triangle is defined by a first point obtained by an intersection of a first axis line, of a first steering column, with a second axis line, of a second steering column, and a second point and a third point; each of said second point and said third point being obtained at extremities of a line defined by a front axle and one of the swing arm pivots in rear.

In an embodiment, said cargo hold chassis comprises a rider's triangle, where a rider's centre of gravity lies in said rider triangle, said rider's triangle is defined by a first point obtained by an intersection of a first axis line, of a first steering column, with a second axis line, of a second steering column, a second point obtained by one of the swing arm pivots, and a third point obtained on an imaginary line perpendicular to ground, on which said vehicle is located, and passing through the rear axle.

In an embodiment, said cargo hold chassis comprises a frame's triangle, where a frame's centre of gravity lies in said frame's triangle, said frame's triangle is defined by a first point obtained on an operative vertical axis line of a steering assembly's handlebar, a second point on a ground and being the other extremity of the same operative vertical axis line of said steering assembly's handlebar, and a third point being the farthest (rearmost) extremity of said rider support chassis.

In an embodiment, said vehicle's centre of gravity is defined by a trapezoid wherein said cargo triangle and said rider triangle form a trapezoid.

In an embodiment, combined centre of gravity of said rider support chassis, said cargo hold chassis, said cargo, and said rider lie in a defined trapezoid.

In an embodiment, said vehicle's centre of gravity is defined by a polygon wherein a first point of said polygon is defined at a point on a front axle of said vehicle, a second point of said polygon is defined at one of the swing arm pivots of said vehicle, a third point of said polygon is defined at a farthest point on said rider support chassis on the rear side of said vehicle, a fourth point of said polygon is defined at an imaginary axis of said vehicle's handlebar's angular displacement, and a fifth point of said polygon is defined at an intersection of a first axis line along a first steering column of said vehicle and a second axis line along a second steering column of said vehicle.

In an embodiment, said vehicle's centre of gravity is defined by a trapezoid wherein a first coordinate is at a front axle of said vehicle, a second coordinate is at one of the swing arm pivots of said vehicle, a third coordinate is at the farthest point on said rider support chassis on the rear side of said vehicle, and a fourth coordinate is on an imaginary line along a top member of said cargo hold chassis of said vehicle.

In an embodiment said vehicle's centre of gravity is defined by a trapezoid wherein trapezoid centre of gravity coordinates are defined where two points are on the front frame members of cargo hold chassis and two points on the rearmost part of the rider support chassis In an embodiment, a rider seat is higher than a lower most portion of said cargo hold chassis and at the rear side of said cargo hold chassis and above the rear axle.

Typically, said vehicle comprises a handlebar of said vehicle is located longitudinally spaced apart from the steering axis.

In an embodiment, said vehicle comprises steering mechanism, said steering mechanism being a four-bar linkage mechanism or a rack and pinion mechanism or a bevel gear mechanism.

In an embodiment, said vehicle comprises a steering mechanism, said steering mechanism being located operatively atop the cargo hold chassis.

In an embodiment, said vehicle comprises steering mechanism, said steering mechanism comprising a steering column mounted in an operative front of said cargo hold chassis, the axis of said steering mechanism is collinear with a front suspension axis, the steering column is spaced apart from said steering handle and a vertical axis about which said steering handle is located is spaced apart from a vertical central axis of said cargo hold chassis in order to provide for off-centre steering.

In an embodiment, said cargo hold chassis comprises a swing arm pivot for mounting a swing arm and at least one mounting location for the suspension mounts.

In an embodiment, a vertical axis of said vehicle's steering handle is parallel to a steering column axis or at an angle to a steering column axis.

In an embodiment, said vehicle comprises a steer-by-wire steering mechanism or a power steering mechanism.

In an embodiment, a main stand of said vehicle being positioned in an operative rear part of said cargo hold chassis and between an imaginary line passing through a centre of said wheelbase and a rear axle.

In an embodiment, a side stand of said vehicle being positioned in an operative rear part of said cargo hold chassis and between an imaginary line passing through a centre of said wheelbase and a rear axle.

BRIEF DESCRIPTION OF THE ACCOMPANYING DRAWINGS

The invention will now be described in relation to the accompanying drawings, in which.

DESCRIPTION OF THE ACCOMPANYING DRAWINGS

According to this invention, there is provided a cargo-carrying wheeled vehicle.

Figure 1:
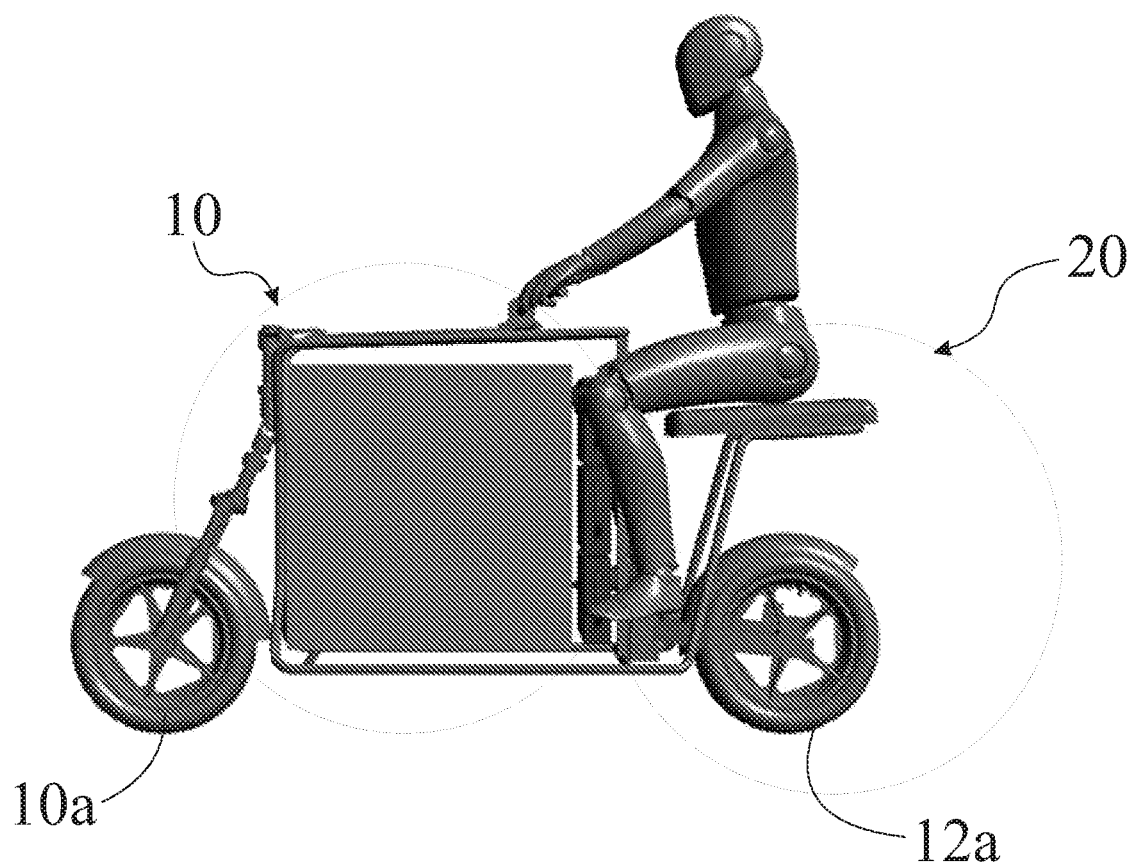
FIG. 1 illustrates a side view of the cargo-carrying vehicle along with rider.

FIG. 1 illustrates a side view of the cargo-carrying vehicle along with rider.

The vehicle is designed to provide a solution for the last mile delivery which is presently carried out using existing scooters or motorcycles which are not functionally and ergonomically designed for the last mile delivery. The scooter is specifically designed to carry cargo so that users can conveniently transport items such as groceries, children, food deliveries, warehouse items, etc. At the same time, through its simple cargo-focused design, the vehicle offers more utility for local transportation needs, at far less cost, with less maintenance than existing bicycles, tricycles, and kick scooters.

In at least an embodiment, this vehicle is defined in terms of at least a cargo hold chassis (10) and at least a rider support chassis (20). The limitations of the prior art are addressed by the geometries of the cargo hold chassis and the rider support chassis. It is a desired objective of this invention to provide a structural framework in which the cargo hold chassis (10) and the rider support chassis (20) cooperate to maintain centre of gravity of the vehicle, especially after addition of cargo (along with battery) and rider, relatively lower (closer to ground) and substantially on or very near to the centerline of the wheelbase of this vehicle (between 10a and 12a).

In at least an embodiment, the cargo hold chassis (10) comprises a structural framework which, essentially, holds a cargo within the structural framework. This cargo hold chassis is located operatively forward and operatively lower with respect to the rider support chassis. The cargo hold chassis comprises at least a lateral support member (i.e. front and back support member) along with an operative top support member and an operative bottom support member to form a contoured space to hold cargo. In one of the embodiments, any single or any combination of these support members can hold battery packs which are communicably coupled to the drive of this vehicle. The cargo hold chassis, typically, is communicably coupled with a front wheel (10a) or a front set of wheels. The front wheel is located on a front axle communicably coupled to a steering mechanism.

In one other embodiment, the cargo hold chassis is defined such that an operative front half of this cargo hold chassis is made relatively heavier and an operative rear half of this cargo hold chassis is made relatively lighter for mass centralization. In this case, when a rider is seated on the rider support chassis, the entire vehicle is in a balanced configuration.

In at least an embodiment, the rider support chassis (20) comprises a structural framework which, essentially, holds a rider on the structural framework. This rider support chassis is located operatively rearward with respect to the cargo hold chassis. The rider support chassis comprises at least a lateral support member (i.e. front and back support member) along with an operative top support member and an operative bottom support member to form a contoured framework to hold a rider on its top support member. In one of the embodiments, any single or any combination of these support members can hold battery packs which are communicably coupled to the drive of this vehicle. The rider support chassis, typically, is communicably coupled with a rear wheel (12a) or a rear set of wheels. The rear wheel is located on a rear axle. The top support member of the rider support chassis is located at a height such that the rider, when seated, has his individual centre of gravity operatively higher than the individual centre of gravity of the cargo load.

In one embodiment, the back lateral support member of the cargo hold chassis and the front lateral support member of the rider support chassis is a single same member.

In one embodiment, the top support member of the cargo hold chassis is twice in length than the top support member of the rider support chassis.

In at least an embodiment, whether a rider and/or cargo/ and battery and/or combinations, is on the vehicle, weight distribution is such that distribution of weight at the front axle varies between 25% and 75% while the distribution of weight at the corresponding rear axle varies between 75% and 25%.

The front axle weight and the rear axle weight distribution are maintained in the following manner:

Front Axle Weight—>=25% & Rear Axle Weight<=75%; or

Font Axle Weight—>=75% & Rear Axle Weight<=25%

In terms of weight, the weight of battery and cargo (in the cargo hold chassis) substantially counterbalances the weight of the rider (on the rider support chassis); thereby, maintaining the centre of gravity of the vehicle, especially after addition of cargo and rider, relatively lower (closer to ground) and substantially on or very near to the centerline of the wheelbase of this vehicle (between 10a and 12a).

In at least an embodiment, mass centralization for this vehicle is achieved by adding cargo in the cargo hold chassis. When the vehicle is fully loaded and a rider is riding the vehicle, the centre of gravity is lying in proximity to centre of the wheelbase of the vehicle. Addition of load in the cargo hold area (defined by the cargo hold chassis decreases height of the centre of gravity; thereby, improving handling and dynamics of this vehicle.

In terms of mass centralization, weight battery and cargo (in the cargo hold chassis) substantially counterbalances the weight of the rider (on the rider support chassis); thereby, maintaining the centre of gravity of the vehicle, especially after addition of cargo and rider, relatively lower (closer to ground) and substantially on or very near to the centerline of the wheelbase of this vehicle (between 10*a* and 12*a*).

In another embodiment the mass centralization of the vehicle with cargo and rider is achieved by using different diameters of front and rear wheel. Use of smaller diameter wheel in front and bigger diameter wheel in rear makes the chassis forward biased, thereby increasing the weight on front wheel, which is counterbalanced when rider is seated on the Rider support chassis. When bigger diameter wheel is used in the front and smaller diameter wheel is used in the rear, the chassis becomes rear biased. The Cargo weight in Cargo hold chassis is balanced by the Rider weight on the Rider support chassis.

In at least an embodiment, the vehicle comprises a gyroscope located at the base of either the cargo hold chassis or the rider support chassis. Its aim is to improve handling of the vehicle. Gyroscope is a device consisting of a wheel or disc mounted so that it can spin rapidly about an axis which is itself free to alter in direction. The orientation of the axis is not affected by tilting of the mounting, so gyroscopes can be used to provide stability or maintain a reference direction in navigation systems, automatic pilots, and stabilizers. When exposed to external forces it helps in improving the stability. By adding a spinning wheel—gyroscope under the cargo hold chassis, the rider would be able to balance the vehicle better at slow speeds and broken roads.

Figure 2:
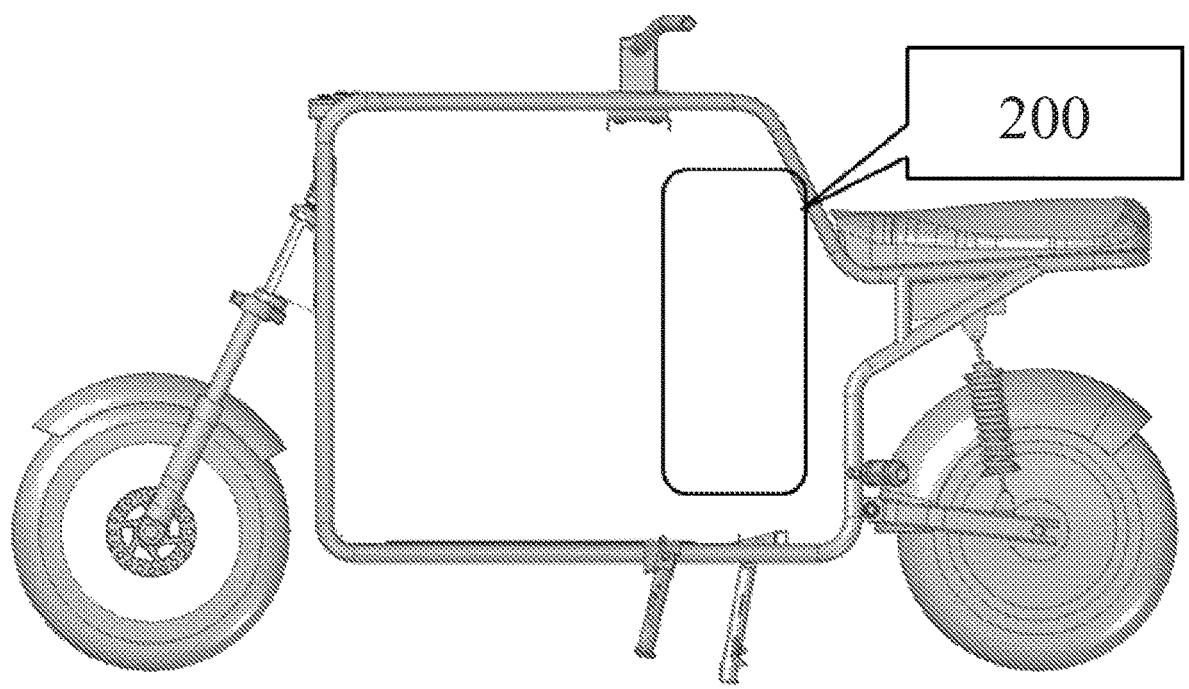
FIG. 2 illustrates centre of gravity of the vehicle when the vehicle is unloaded and has no rider. In this case, the vehicle has no battery.

FIG. 2 illustrates centre of gravity of the vehicle when the vehicle is unloaded and has no rider. In this case, the vehicle has no battery.

Figure 3:
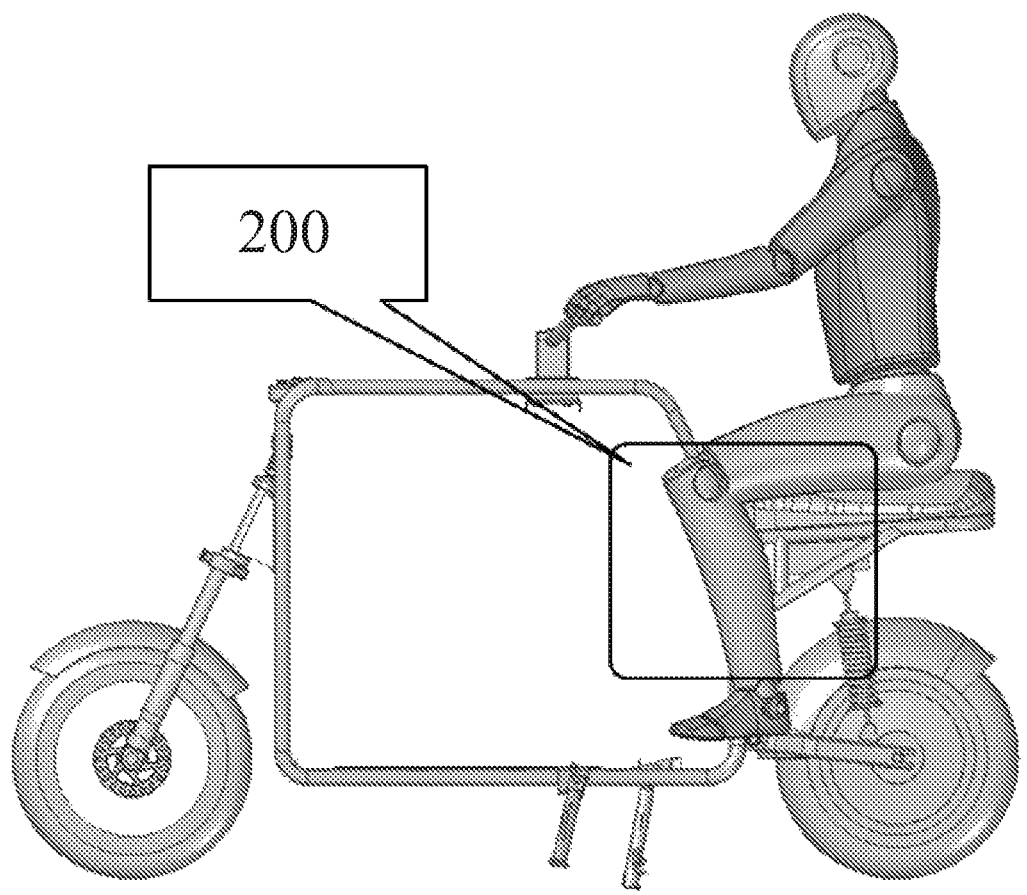
FIG. 3 illustrates centre of gravity of the vehicle when the vehicle is unloaded and a rider is seated. In this case, the vehicle has no battery.

FIG. 3 illustrates centre of gravity of the vehicle when the vehicle is unloaded and a rider is seated. In this case, the vehicle has no battery.

Figure 4:
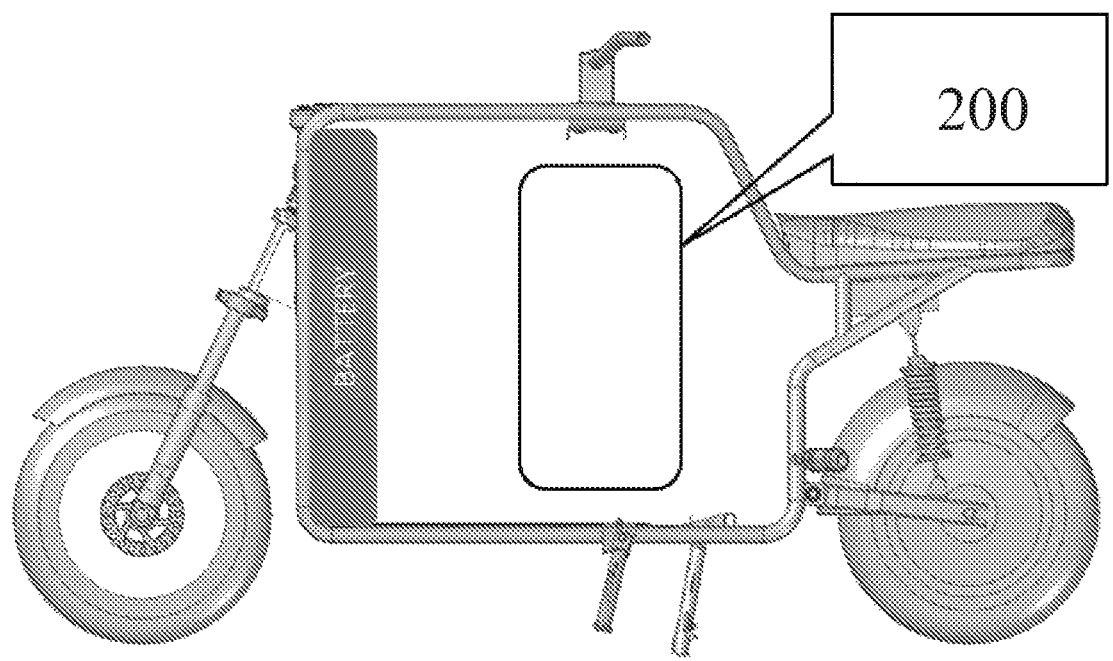
FIG. 4 illustrates centre of gravity of the vehicle when the vehicle is unloaded, has no rider, and the cargo hold chassis is fitted with battery in its operative front part.

FIG. 4 illustrates centre of gravity of the vehicle when the vehicle is unloaded, has no rider, and the cargo hold chassis is fitted with battery in its operative front part.

Figure 5:
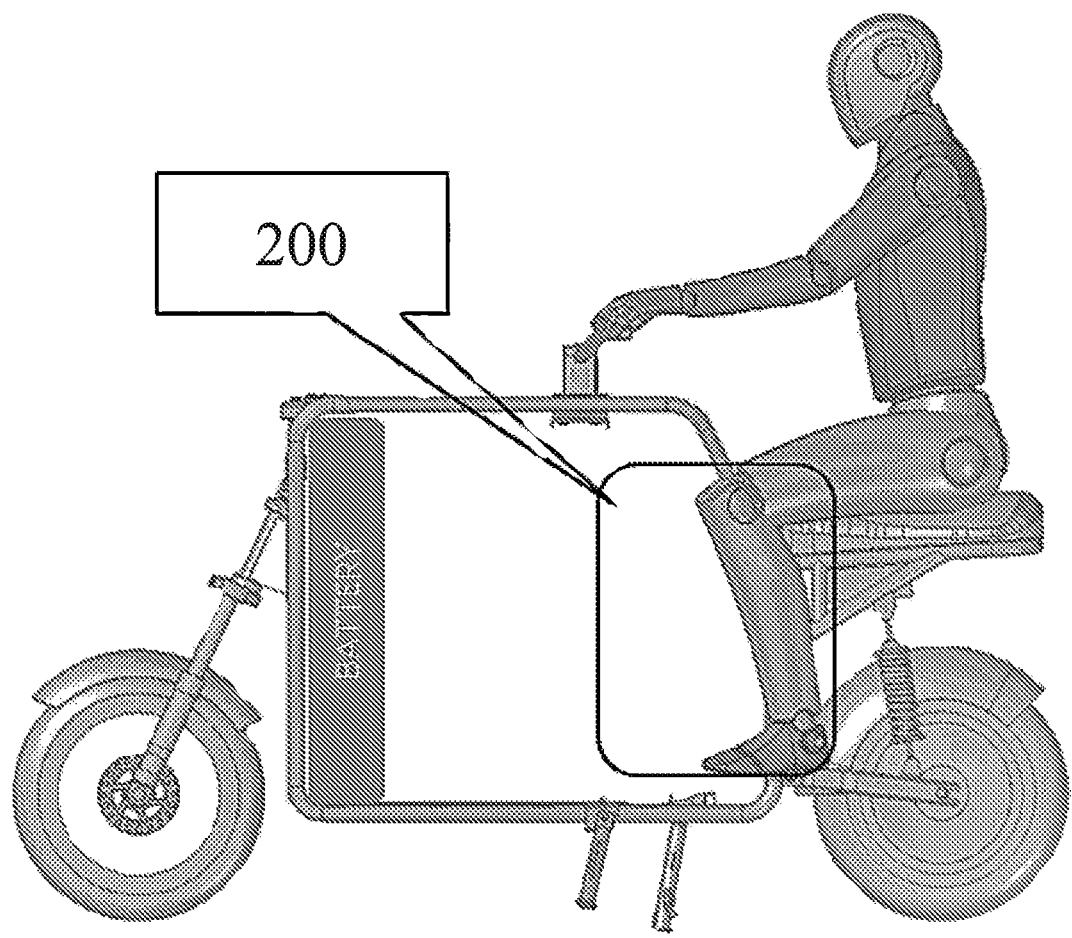
FIG. 5 illustrates centre of gravity of the vehicle when the vehicle is unloaded, has a rider, and the cargo hold chassis is fitted with battery in its operative front part.

FIG. 5 illustrates centre of gravity of the vehicle when the vehicle is unloaded, has a rider, and the cargo hold chassis is fitted with battery in its operative front part.

Figure 6:
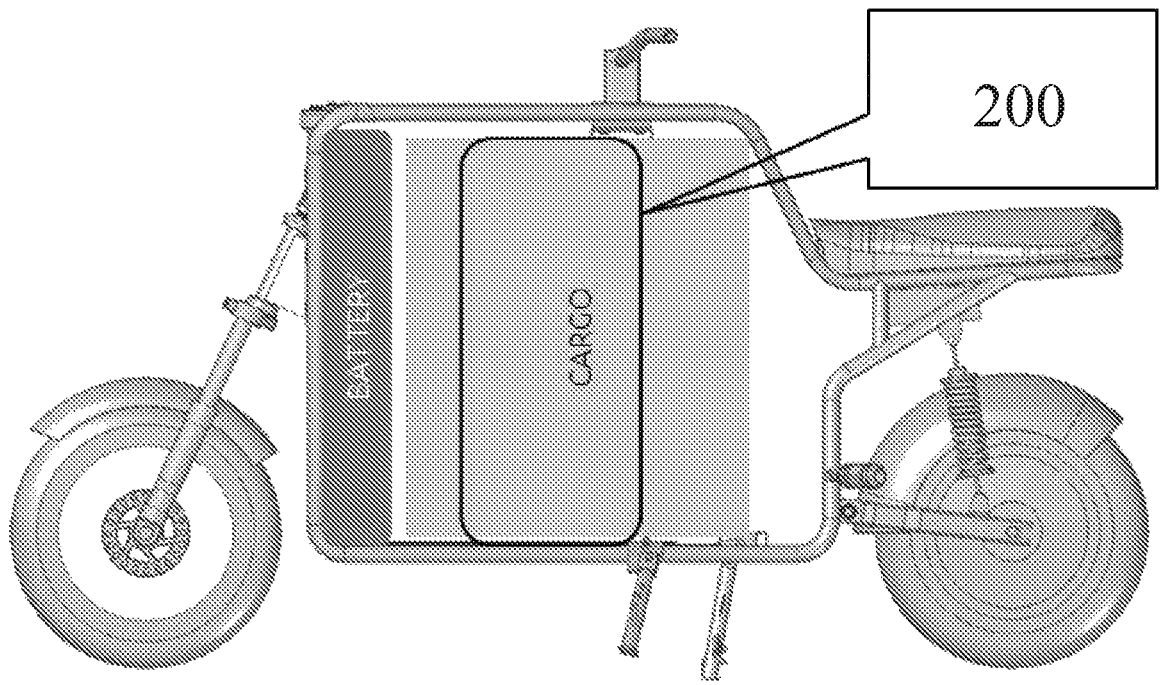
FIG. 6 illustrates centre of gravity of the vehicle when the vehicle is loaded, has no rider, and the cargo hold chassis is fitted with battery in its operative front part.

FIG. 6 illustrates centre of gravity of the vehicle when the vehicle is loaded, has no rider, and the cargo hold chassis is fitted with battery in its operative front part.

Figure 7:
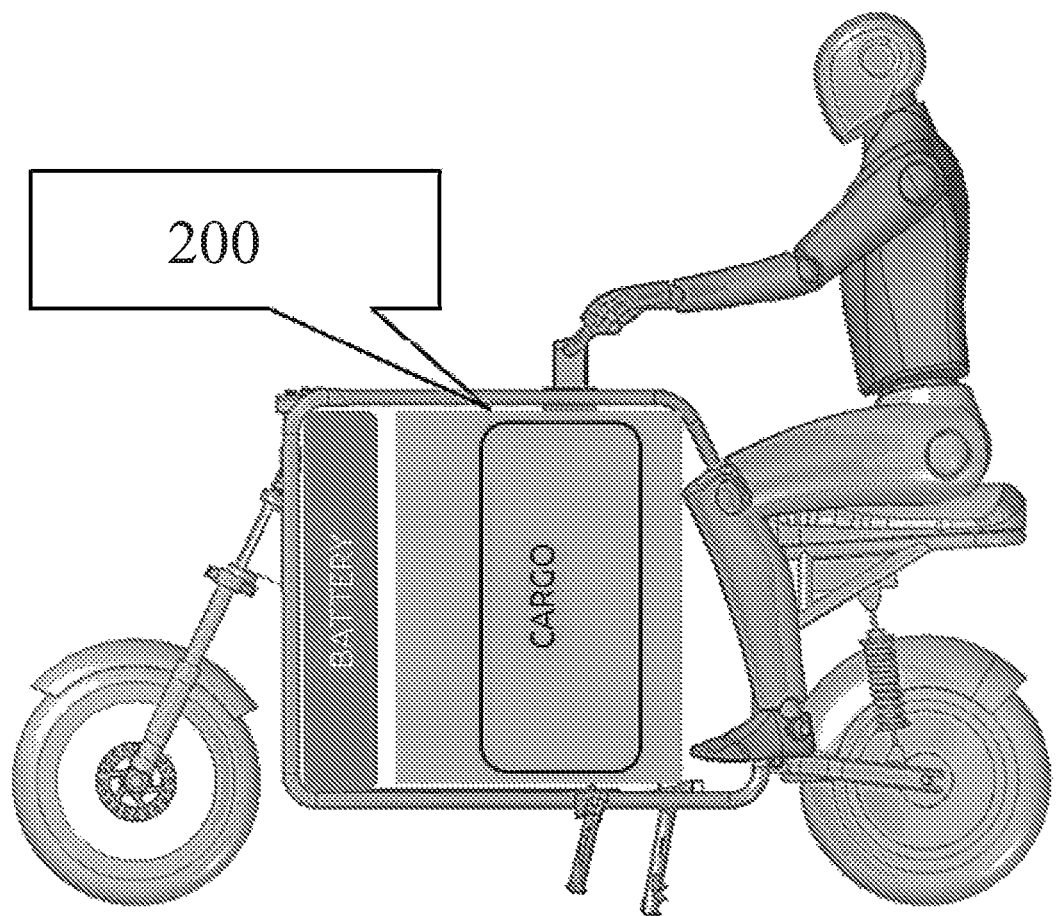
FIG. 7 illustrates centre of gravity of the vehicle when the vehicle is loaded, has a rider, and the cargo hold chassis is fitted with battery in its operative front part.

FIG. 7 illustrates centre of gravity of the vehicle when the vehicle is loaded, has a rider, and the cargo hold chassis is fitted with battery in its operative front part.

Figure 8:
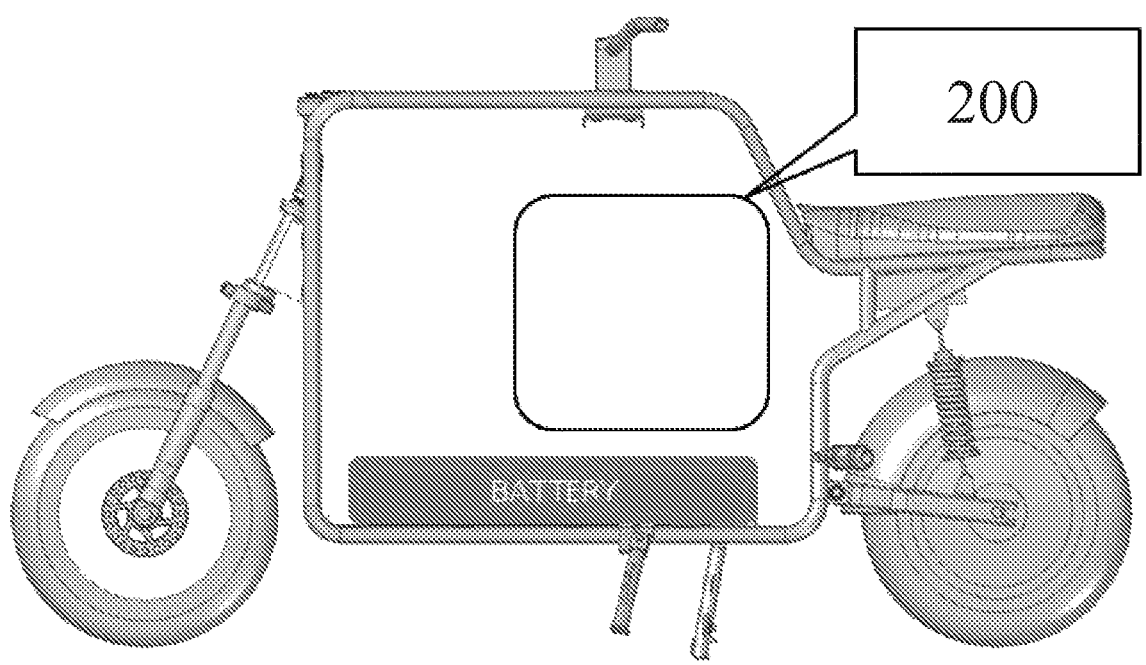
FIG. 8 illustrates centre of gravity of the vehicle when the vehicle is unloaded, has no rider, and the cargo hold chassis is fitted with battery in its operative bottom part.

FIG. 8 illustrates centre of gravity of the vehicle when the vehicle is unloaded, has no rider, and the cargo hold chassis is fitted with battery in its operative bottom part.

Figure 9:
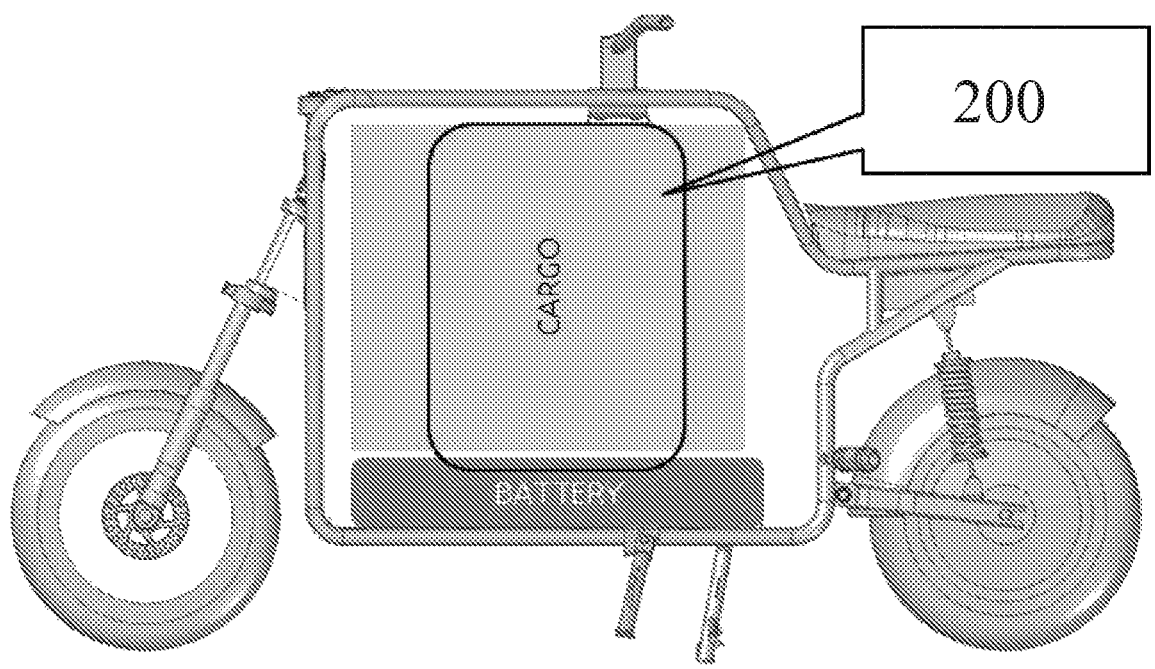
FIG. 9 illustrates centre of gravity of the vehicle when the vehicle is loaded, has no rider, and the cargo hold chassis is fitted with battery in its operative bottom part.

FIG. 9 illustrates centre of gravity of the vehicle when the vehicle is loaded, has no rider, and the cargo hold chassis is fitted with battery in its operative bottom part.

Figure 10:
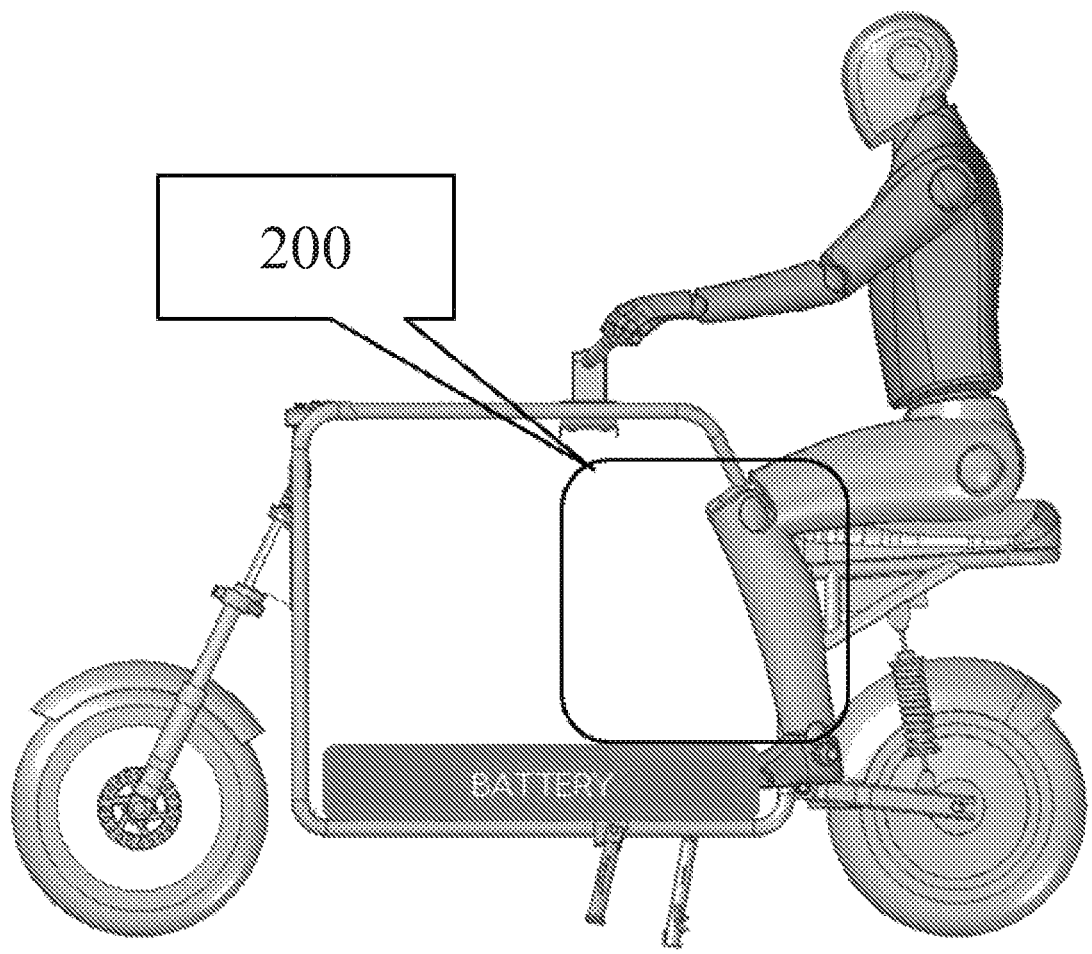
FIG. 10 illustrates centre of gravity of the vehicle when the vehicle is unloaded, has a rider, and the cargo hold chassis is fitted with battery in its operative bottom part.

FIG. 10 illustrates centre of gravity of the vehicle when the vehicle is unloaded, has a rider, and the cargo hold chassis is fitted with battery in its operative bottom part.

Figure 11:
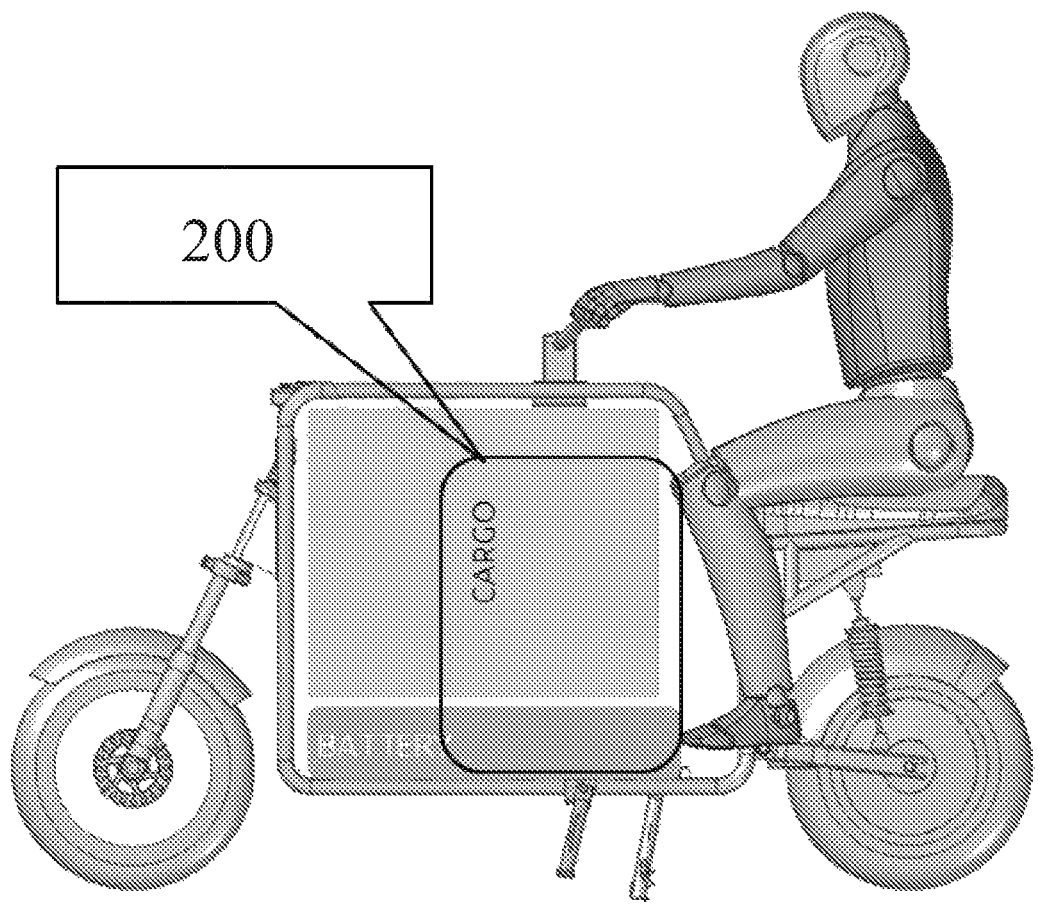
FIG. 11 illustrates centre of gravity of the vehicle when the vehicle is loaded, has a rider, and the cargo hold chassis is fitted with battery in its operative bottom part.

FIG. 11 illustrates centre of gravity of the vehicle when the vehicle is loaded, has a rider, and the cargo hold chassis is fitted with battery in its operative bottom part.

Figure 12:
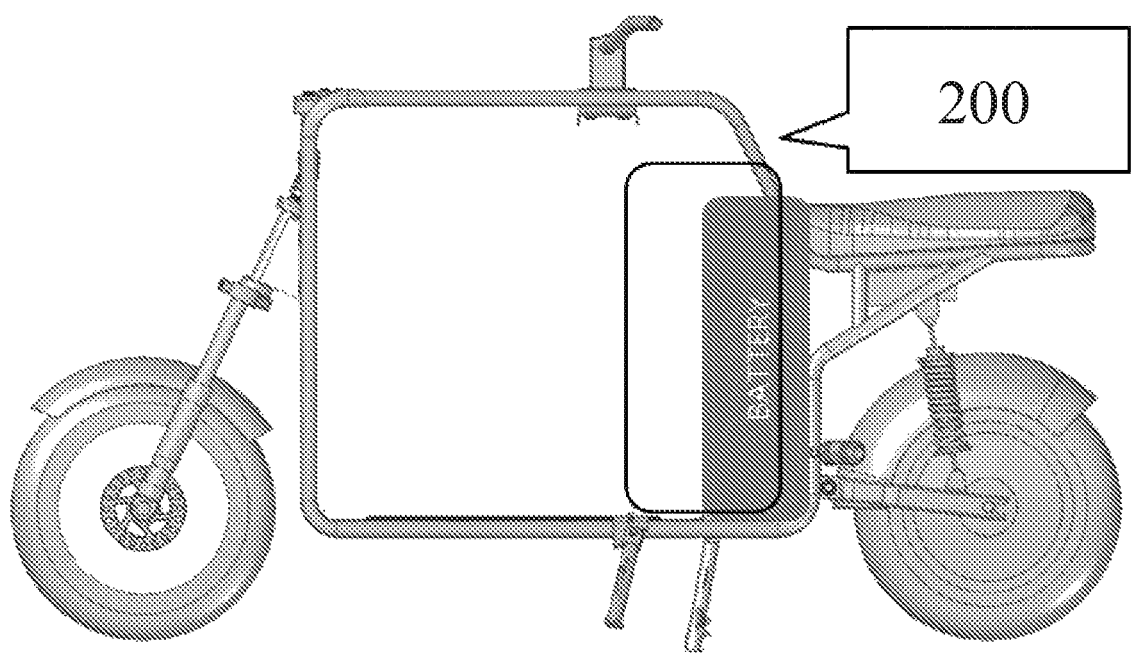
FIG. 12 illustrates centre of gravity of the vehicle when the vehicle is unloaded, has no rider, and the cargo hold chassis is fitted with battery in its operative rear part.

FIG. 12 illustrates centre of gravity of the vehicle when the vehicle is unloaded, has no rider, and the cargo hold chassis is fitted with battery in its operative rear part.

Figure 13:
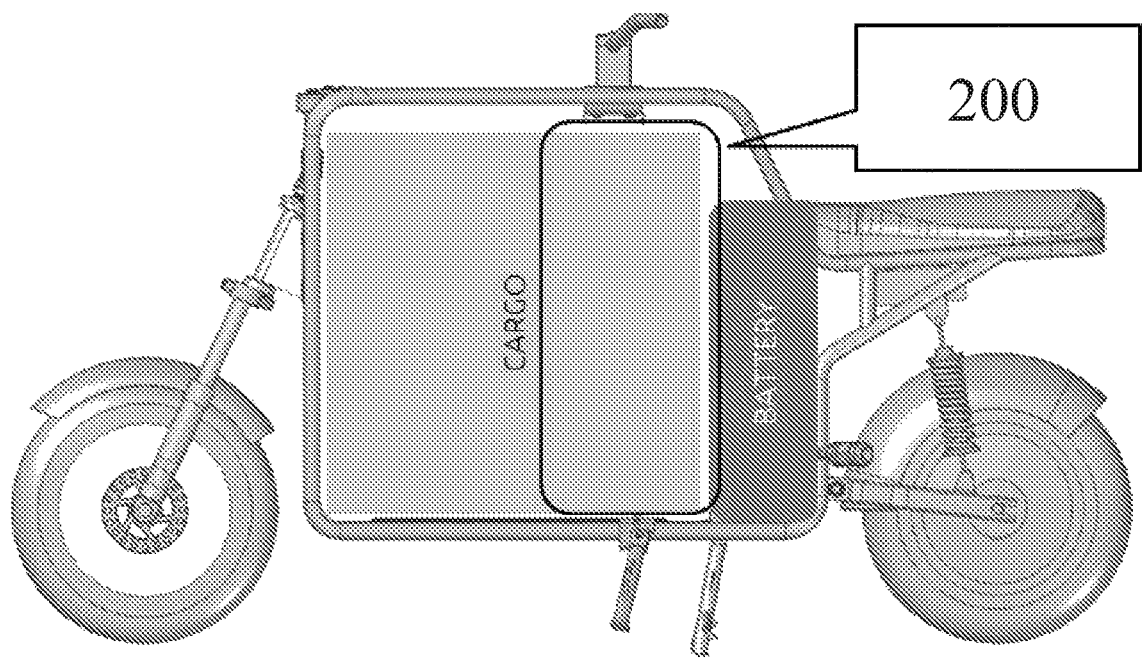
FIG. 13 illustrates centre of gravity of the vehicle when the vehicle is loaded, has no rider, and the cargo hold chassis is fitted with battery in its operative rear part.

FIG. 13 illustrates centre of gravity of the vehicle when the vehicle is loaded, has no rider, and the cargo hold chassis is fitted with battery in its operative rear part.

Figure 14:
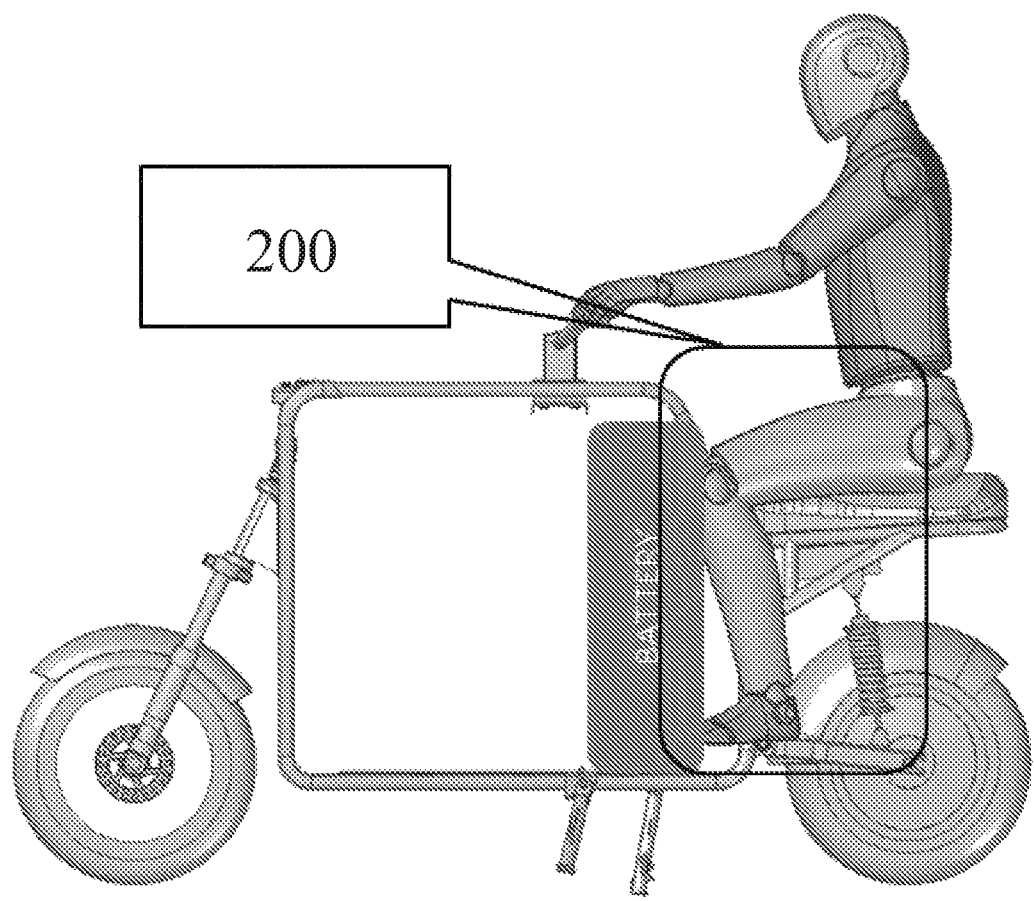
FIG. 14 illustrates centre of gravity of the vehicle when the vehicle is unloaded, has a rider, and the cargo hold chassis is fitted with battery in its operative rear part.

FIG. 14 illustrates centre of gravity of the vehicle when the vehicle is unloaded, has a rider, and the cargo hold chassis is fitted with battery in its operative rear part.

Figure 15:
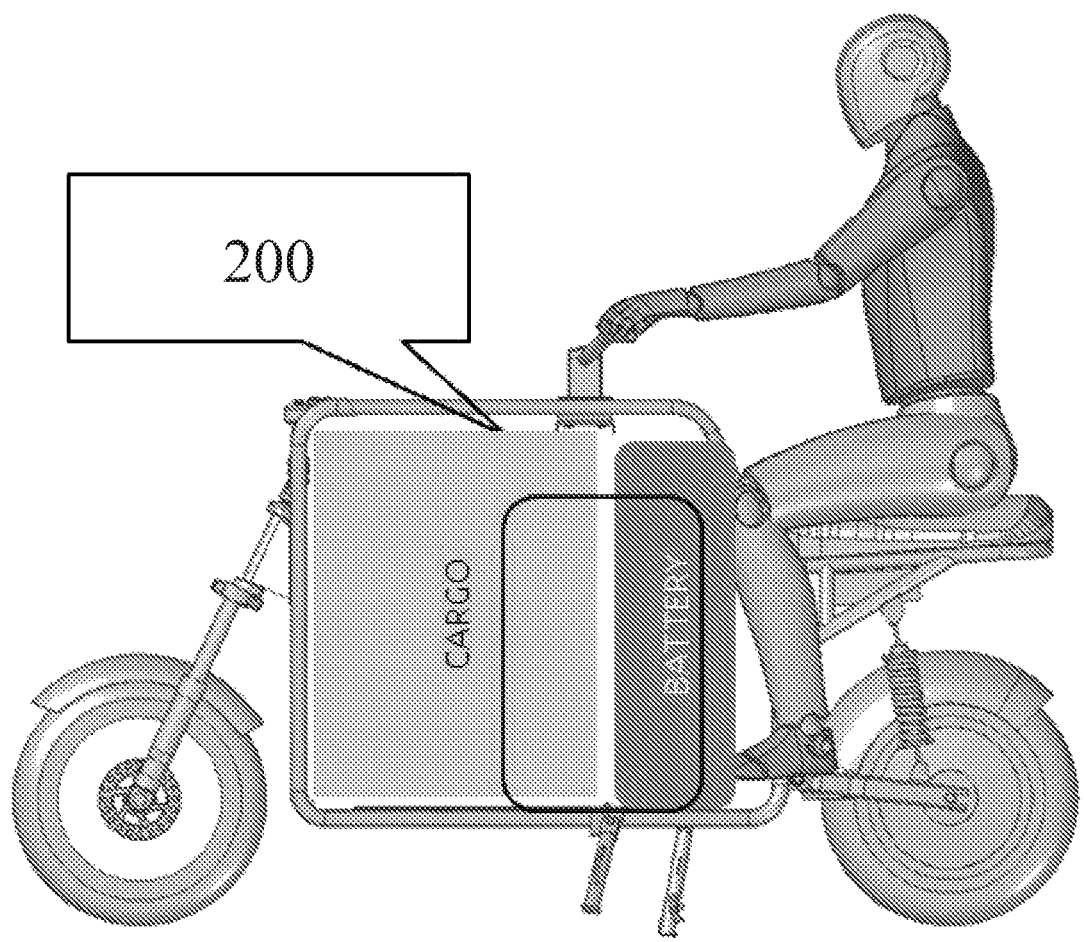
FIG. 15 illustrates centre of gravity of the vehicle when the vehicle is loaded, has a rider, and the cargo hold chassis is fitted with battery in its operative rear part.

FIG. 15 illustrates centre of gravity of the vehicle when the vehicle is loaded, has a rider, and the cargo hold chassis is fitted with battery in its operative rear part.

Figure 16:
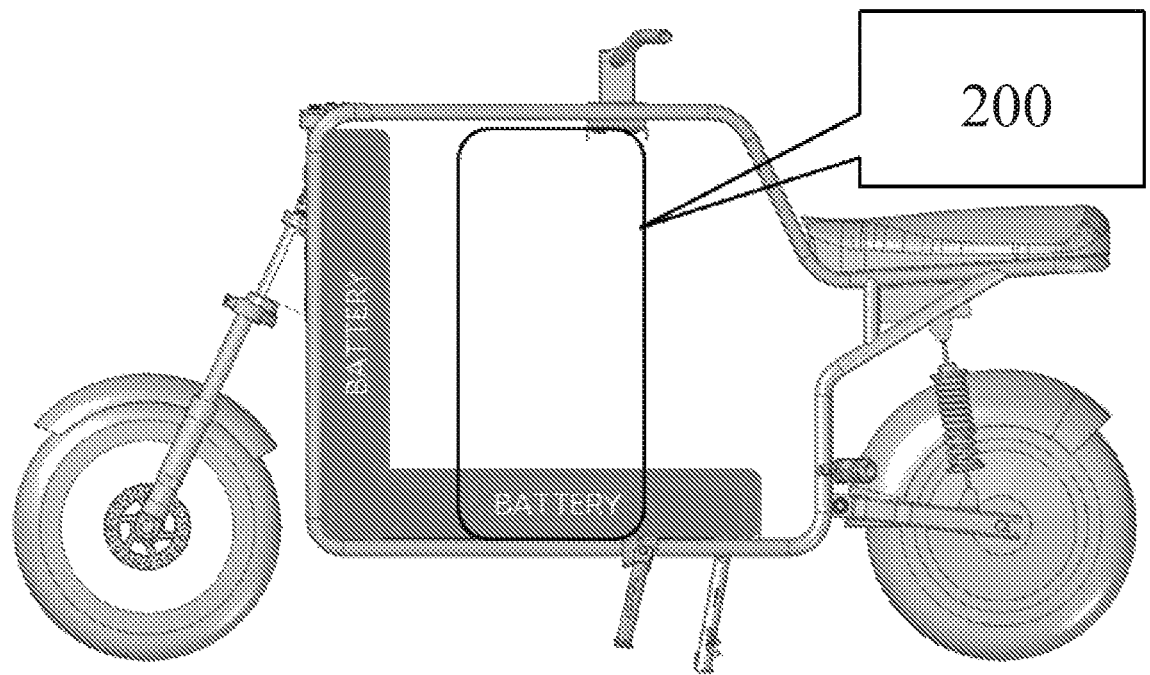
FIG. 16 illustrates centre of gravity of the vehicle when the vehicle is unloaded, has no rider, and the cargo hold chassis is fitted with battery in its operative front part along with in its operative bottom part.

FIG. 16 illustrates centre of gravity of the vehicle when the vehicle is unloaded, has no rider, and the cargo hold chassis is fitted with battery in its operative front part along with in its operative bottom part.

Figure 17:
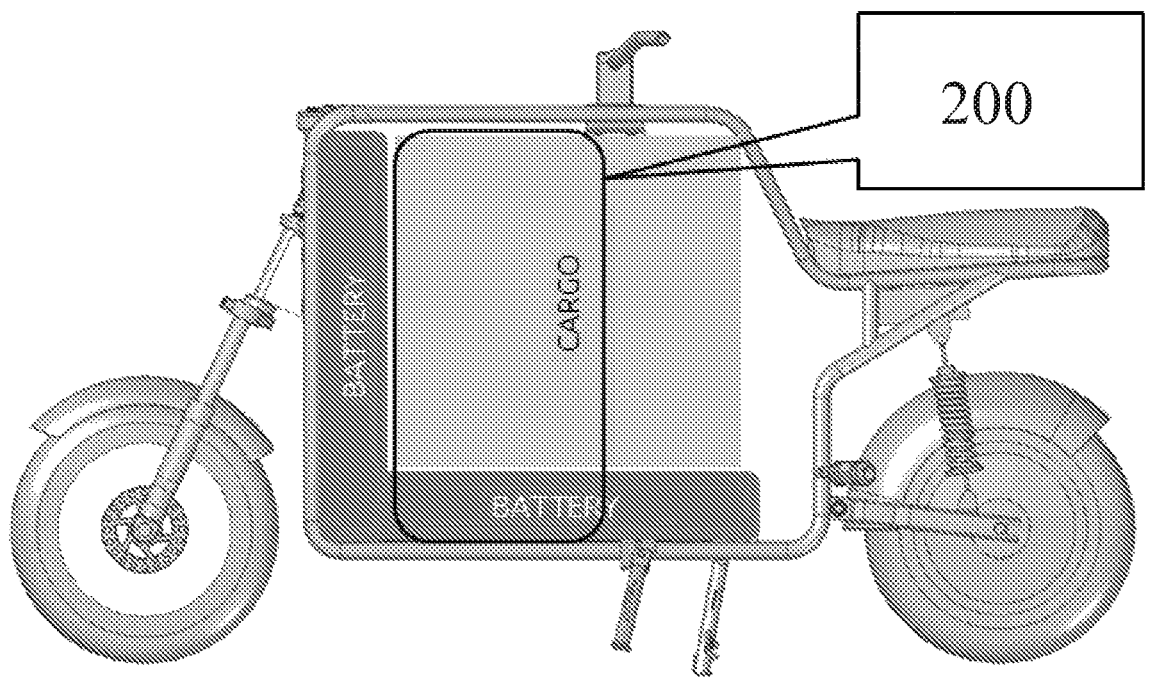
FIG. 17 illustrates centre of gravity of the vehicle when the vehicle is loaded, has no rider, and the cargo hold chassis is fitted with battery in its operative front part along with in its operative bottom part.

FIG. 17 illustrates centre of gravity of the vehicle when the vehicle is loaded, has no rider, and the cargo hold chassis is fitted with battery in its operative front part along with in its operative bottom part.

Figure 18:
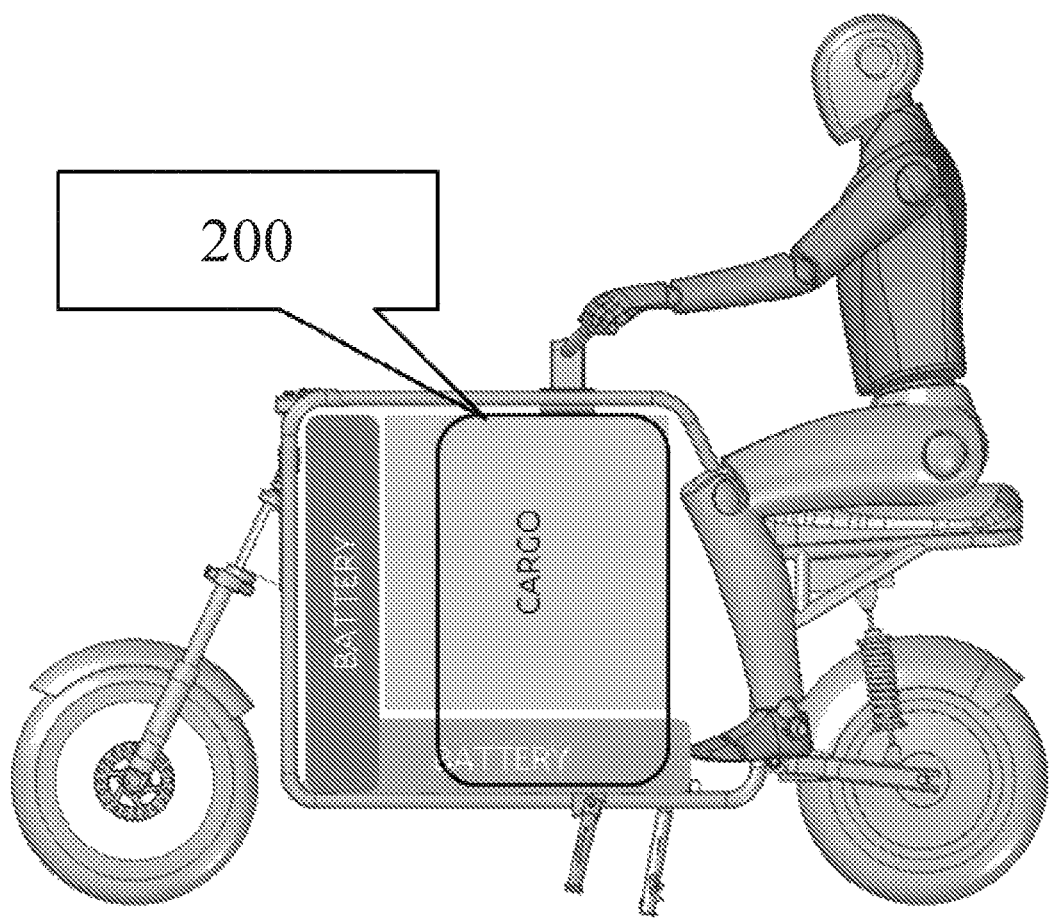
FIG. 18 illustrates centre of gravity of the vehicle when the vehicle is loaded, has a rider, and the cargo hold chassis is fitted with battery in its operative front part along with in its operative bottom part.

FIG. 18 illustrates centre of gravity of the vehicle when the vehicle is loaded, has a rider, and the cargo hold chassis is fitted with battery in its operative front part along with in its operative bottom part.

Figure 19:
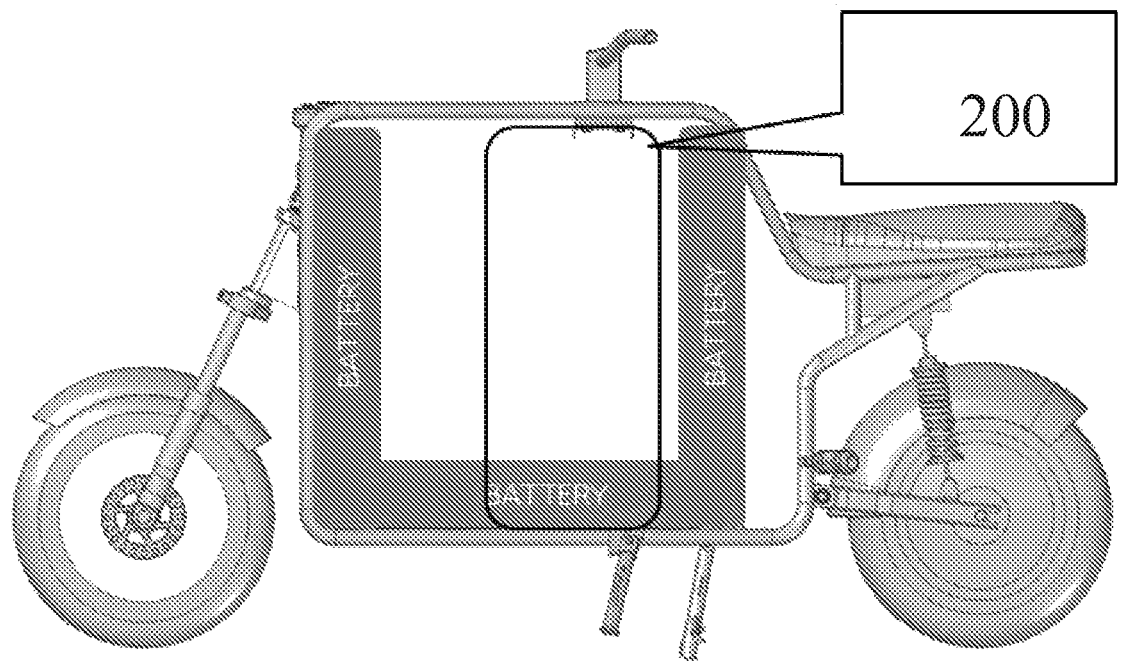
FIG. 19 illustrates centre of gravity of the vehicle when the vehicle is unloaded, has no rider, and the cargo hold chassis is fitted with battery in its operative front part along with in its operative bottom part along with in its operative rear part.

FIG. 19 illustrates centre of gravity of the vehicle when the vehicle is unloaded, has no rider, and the cargo hold chassis is fitted with battery in its operative front part along with in its operative bottom part along with in its operative rear part.

Figure 20:
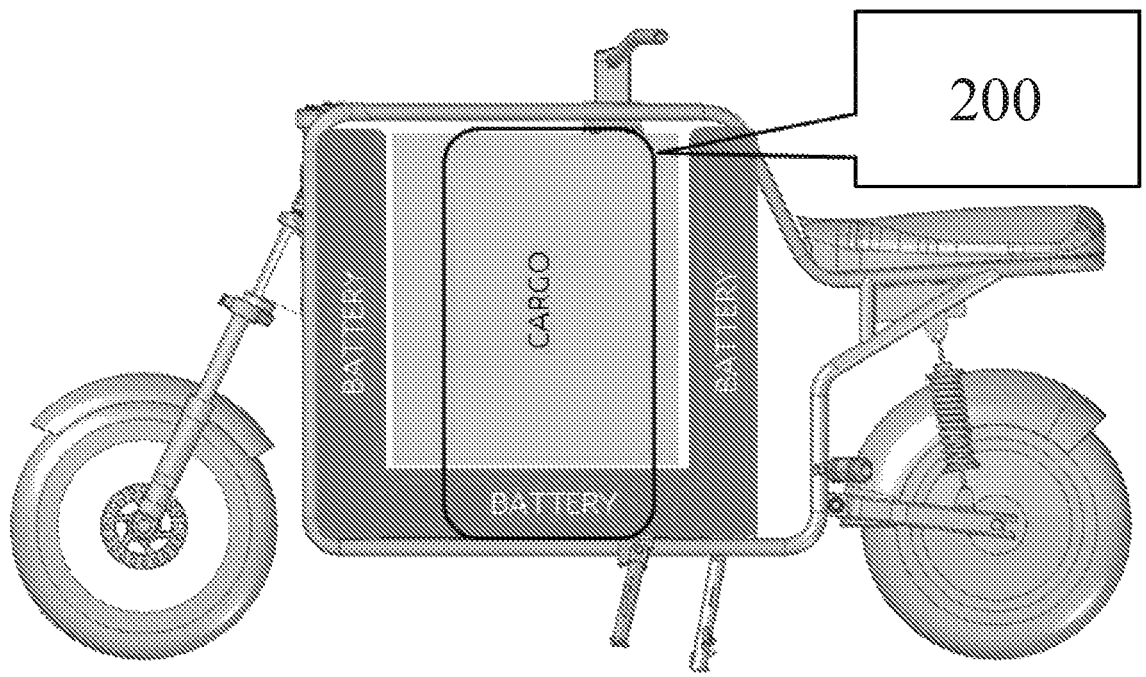
FIG. 20 illustrates centre of gravity of the vehicle when the vehicle is loaded, has no rider, and the cargo hold chassis is fitted with battery in its operative front part along with in its operative bottom part along with in its operative rear part.

FIG. 20 illustrates centre of gravity of the vehicle when the vehicle is loaded, has no rider, and the cargo hold chassis is fitted with battery in its operative front part along with in its operative bottom part along with in its operative rear part.

Figure 21:
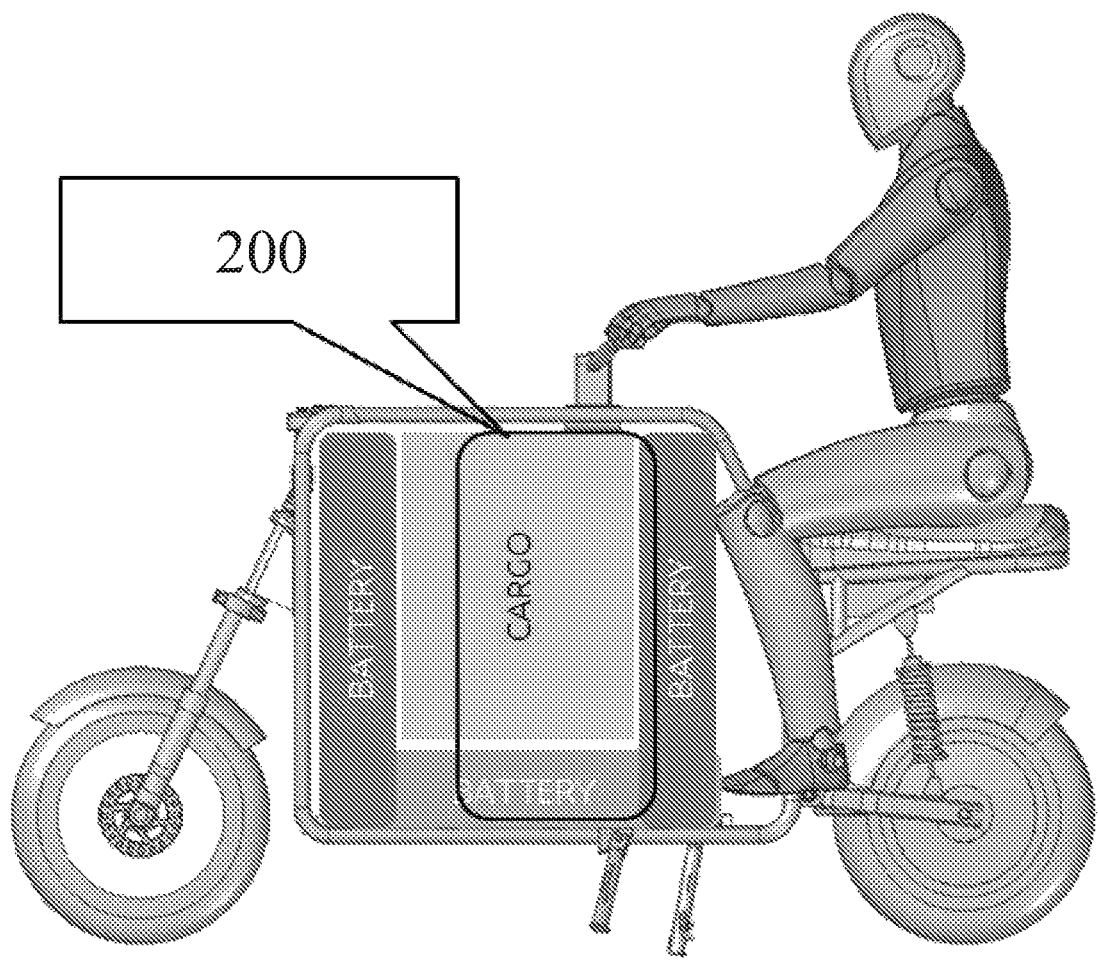
FIG. 21 illustrates centre of gravity of the vehicle when the vehicle is loaded, has a rider, and the cargo hold chassis is fitted with battery in its operative front part along with in its operative bottom part along with in its operative rear part.

FIG. 21 illustrates centre of gravity of the vehicle when the vehicle is loaded, has a rider, and the cargo hold chassis is fitted with battery in its operative front part along with in its operative bottom part along with in its operative rear part.

From FIGS. 2 to 21, it can be observed that the centre of gravity lies in pre-defined zone which maintains the balance of the innate balance of the vehicle irrespective of the fact that there is a rider or not, irrespective of the fact that there is cargo or not, and irrespective of where the battery is position. This pre-defined zone (200) is defined by a boundary with its front extremities not exceeding the from internal framework of the cargo hold chassis, with its rear extremities not exceeding the hip of a rider, with its upper extremities not exceeding the upper frame of the cargo hold chassis, and with its lower extremities not exceeding the lower frame of the cargo hold chassis.

In at least an embodiment, the battery is located on any portion or member of any of the chassis based on requirement of weight distribution. In at least an embodiment, the battery is located in front of the cargo hold enclosure adjacent to the steering column allowing the front axle to be heavier. Addition of cargo, in the cargo hold enclosure, adds more load on the front axle, thereby shifting the centre of gravity towards the front axle. In another embodiment, the battery is located below the cargo hold enclosure. In yet another embodiment, the battery is located on the top member of the cargo support chassis. In still another embodiment, the battery is located on the back side of the cargo support chassis, below a rider seat on the rider support chassis. In yet another embodiment, a steering column is mounted on a battery pack on the operative front side which also acts as a stress member of the cargo hold chassis. It still another embodiment, the battery packs are distributed in various parts of the vehicles, the various parts being selected from members of the cargo hold chassis, the rider support chassis, and/or combination of cargo hold chassis and rider support chassis.

In at least an embodiment, the handlebar of this vehicle is located longitudinally spaced apart from the steering axis. Preferably, the steering mechanism is a four-bar linkage mechanism or a rack and pinion mechanism or a bevel gear mechanism. This steering mechanism is located operatively atop the cargo hold chassis (10). Damping effect on the steering mechanism can be carried out by means of shimmy dampers—mechanical, pneumatic, magnetic, or hydraulic type.

Figure 22:
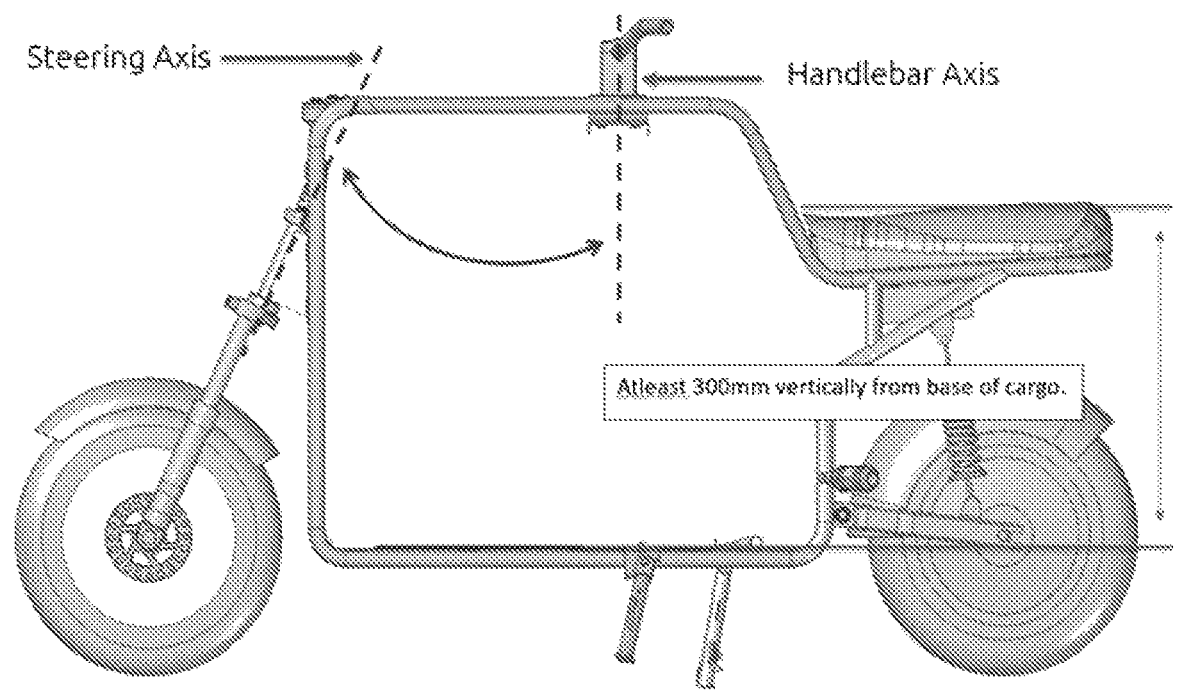
FIG. 22 illustrates the steering mechanism in terms of axis of the steering handle axis and the steering column axis.

FIG. 22 illustrates the steering mechanism in terms of axis of the steering handle axis and the steering column axis.

In at least an embodiment of the steering mechanism, a steering column is mounted in the operative front of the cargo hold chassis. The axis of the steering mechanism is collinear with the front suspension axis. The steering column is spaced apart from the steering handle and the vertical axis about which the steering handle is located is spaced apart from the vertical central axis of the cargo hold chassis in order to provide for off-centre steering. The cargo hold chassis comprises a swing arm pivot for mounting a swing arm and at least one mounting location for the suspension mounts.

The vertical axis of the steering handle can be parallel to the steering column axis or at an angle to the steering column axis.

The vertical axis of the steering handle can also be adjustable by the user based on user comfort level.

Figure 23:
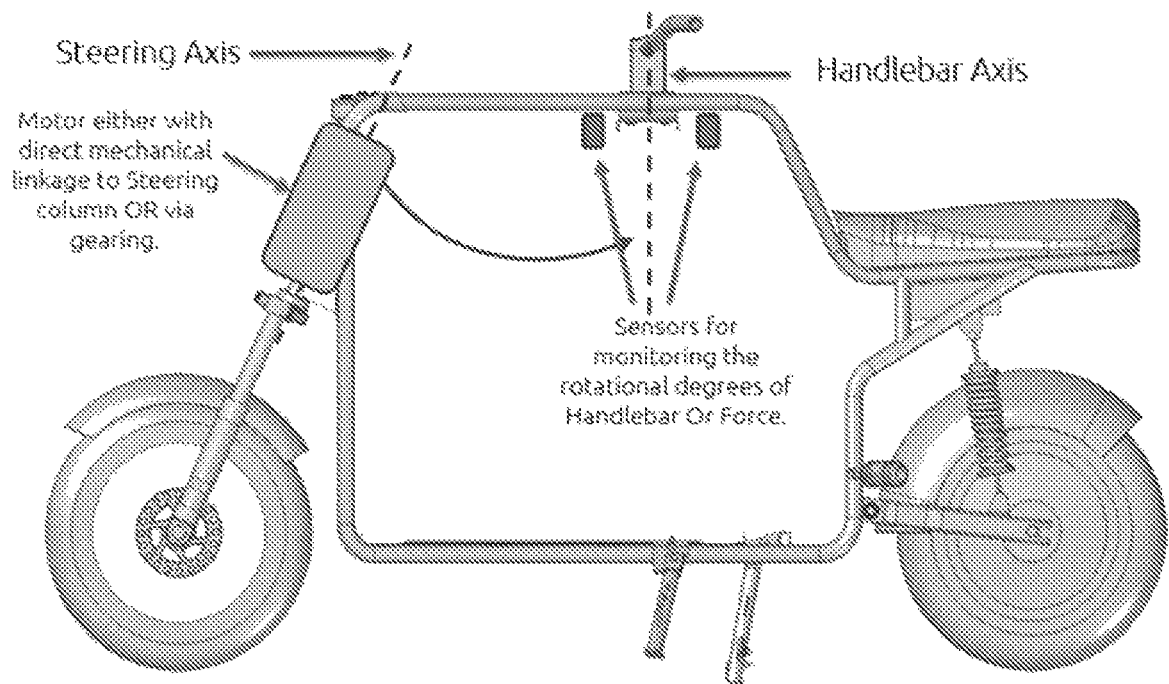
FIG. 23 illustrates the vehicle's steer-by-wire steering mechanism or a power steering mechanism.

FIG. 23 illustrates the vehicle's steer-by-wire steering mechanism or a power steering mechanism.

Figure 23A:
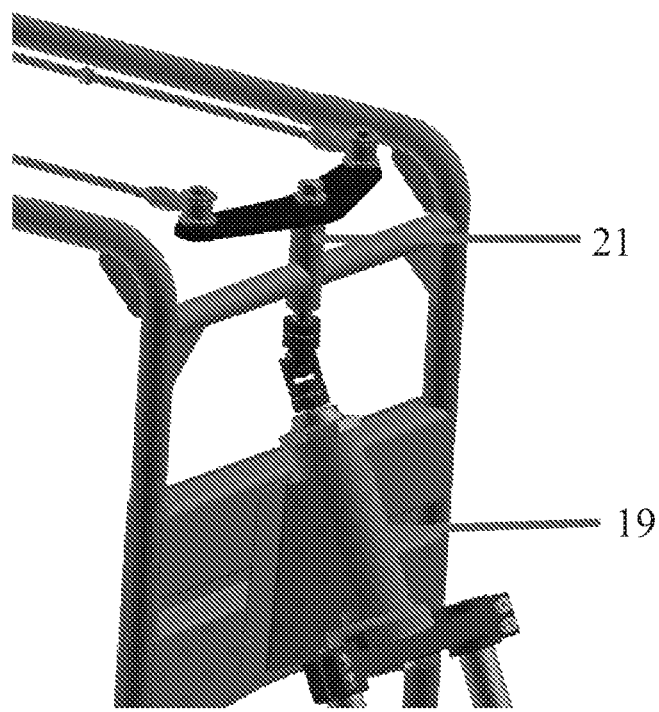
FIG. 23a illustrates two steering columns of the steering mechanism.

FIG. 23a illustrates two steering columns of the steering mechanism.

In at least an embodiment, the steering mechanism is a steer-by-wire steering mechanism or a power steering mechanism. In at least an embodiment, the steering mechanism comprises sensors and motors where the sensors are located at the handlebar axis. The handlebar rotation about its axis is monitored by sensors, which reads the rotational degrees of movement and/or force on handlebar by the rider input. A motor is located in communication with the front wheel of this vehicle either directly driving the steering or by use of gearing. A controller monitors the rider's inputs and provides inputs to the motor for turning the vehicle steering. Any handle movement is captured and replicated at the front wheel through this steering mechanism.

Figure 24:
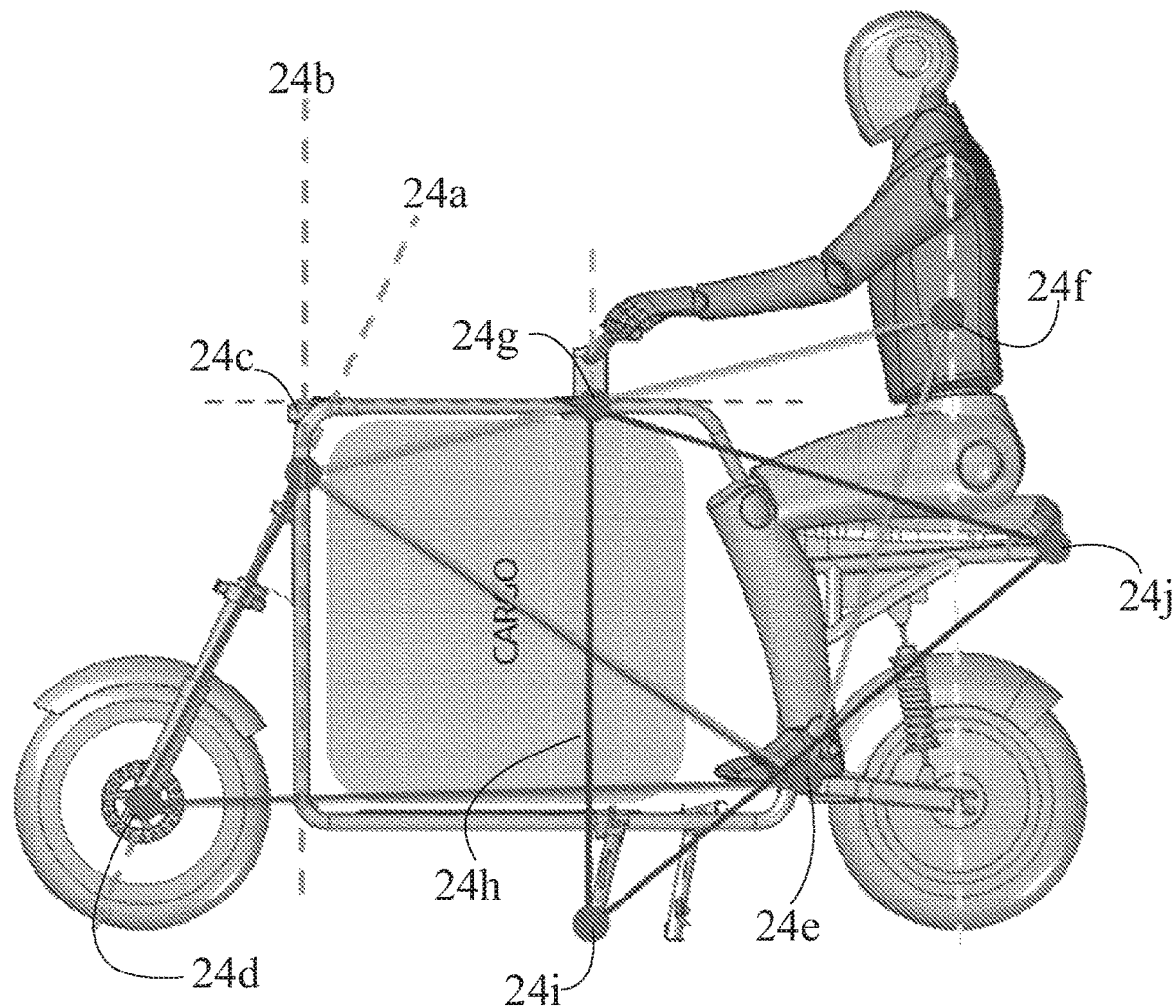
FIG. 24 illustrates the chassis framework of this vehicle along with a cargo triangle, rider triangle, and frame triangle.

FIG. 24 illustrates the chassis framework of this vehicle along with a cargo triangle, rider triangle, and frame triangle.

A cargo hold chassis is provided with an extension for rider seat on the rear side of the cargo hold chassis. Where the rider seat extension could be either fixed to the cargo hold chassis or a sub-frame mounted on the cargo hold chassis, which is not removable by user. The seat location is at least 300 mm vertically away from the base of the cargo hold chassis. The Cargo hold chassis is designed to balance the overall centre of gravity of the vehicle by balancing the rider weight with the cargo weight.

In at least an embodiment, the enclosed cargo hold chassis is described, where the cargo hold chassis comprises two steering columns (19, 21) in its operative front. The first steering column (19) defines a rake angle of the front suspension and the second steering column (21) is for translation of steering input to a triple tree. The intersection of a first axis line (24a) along the first steering column (19) and a second axis line (24b) along the second steering column (21) defines a point (24c) where a universal joint would be fixed.

In the cargo hold chassis, a cargo triangle, where the centre of gravity of cargo vests when there is no rider, is defined by a first point (24c) obtained by the intersection of the first axis line (of the first steering column) (24a) with the second axis line (of the second steering column) (24b), and a second point (24d) and a third point (24e); both obtained at extremities of a line defined by front axle and swing arm pivot in rear.

A rider's centre of gravity lies in a rider triangle defined by a first point (24c) is obtained by the intersection of the first axis line (of the first steering column) (24a) with the second axis line (of the second steering column) (24b), a second point (24e) obtained by the swing arm pivot, and a third point (24f) obtained on an imaginary line perpendicular to the ground, on which the vehicle is located, and passing through the rear axle.

A frame's centre of gravity lies in a frame's triangle defined by a first point (24g) obtained on an operative vertical axis line (24h) of the steering assembly's handlebar, a second point (24i) on a ground and being the other extremity of the same operative vertical axis line (24h) of the steering assembly's handlebar, and a third point being the farthest (rearmost) extremity (24j) of the rider support chassis.

In at least another embodiment, the centre of gravity is defined by a trapezoid wherein the cargo triangle (24c, 24d, 24e) and the rider triangle (24c, 24e, 24f) form a trapezoid. The combined centre of gravity of frame, cargo, and rider would also lie in the trapezoid as defined.

Figure 25:
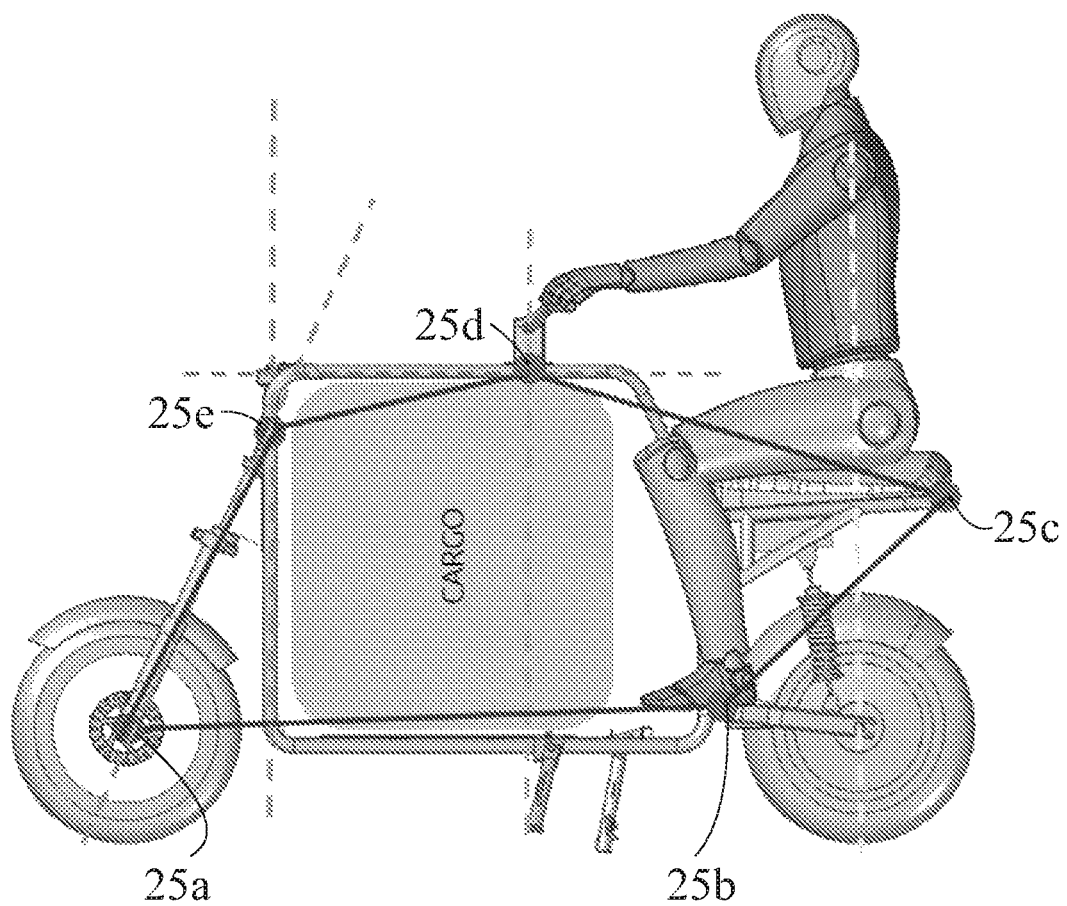
FIG. 25 illustrates a side view of the vehicle, in that, a polygonal centre of gravity is defined for this vehicle.

FIG. 25 illustrates a side view of the vehicle, in that, a polygonal centre of gravity is defined for this vehicle.

In at least another embodiment, the centre of gravity is defined by a polygon wherein a first point (25a) of the polygon is defined at a point on the front axle, a second point (25b) of the polygon is defined at the swing arm mount, a third point (25c) of the polygon is defined at the farthest point on the rider support chassis on the rear side, a fourth point (25d) of the polygon is defined at the imaginary axis of the handlebar's angular displacement, and a fifth point (25e) of the polygon is defined at the intersection of intersection of a first axis line along the first steering column and a second axis line along the second steering column.

Figure 26:
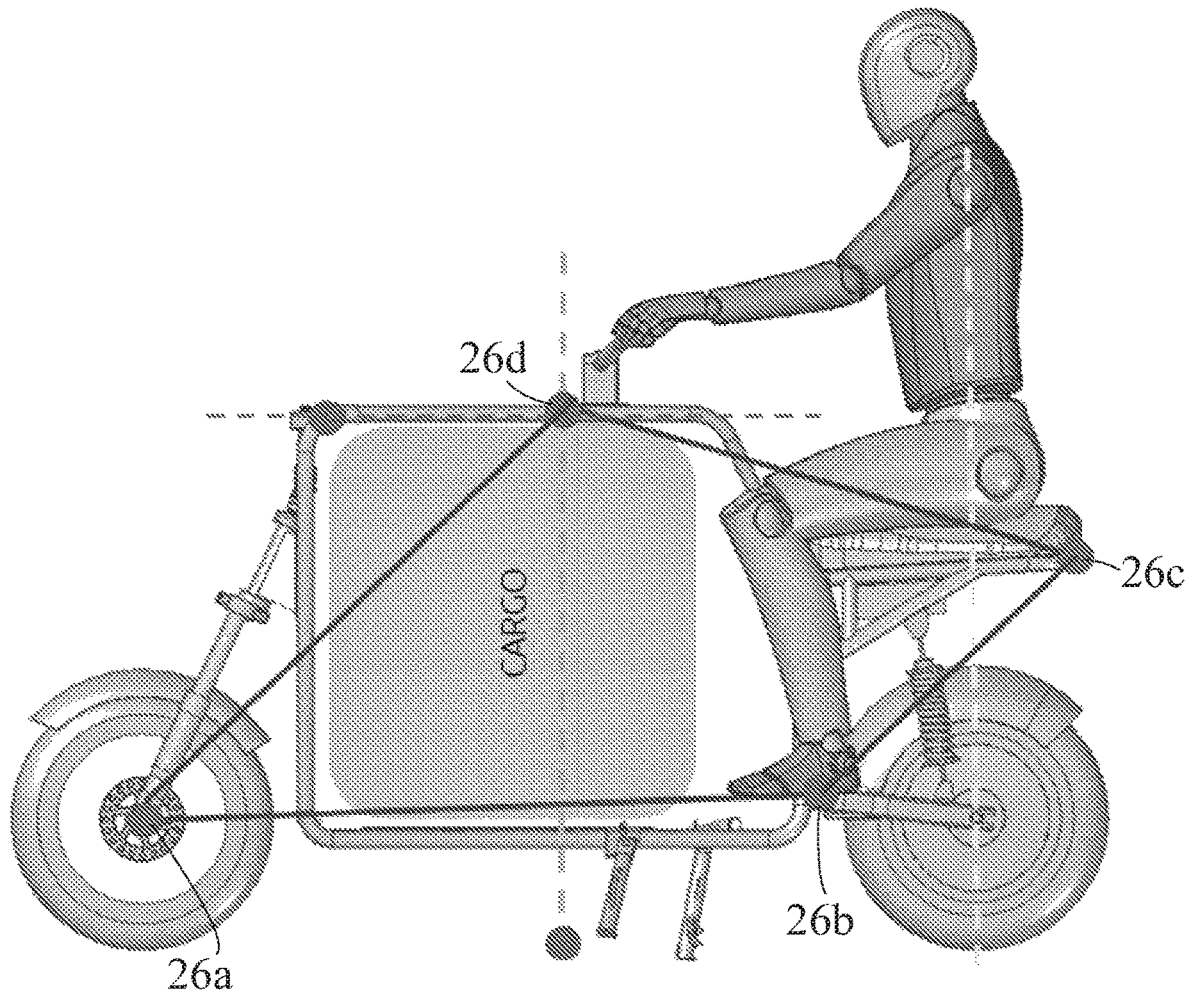
FIG. 26 illustrates a side view of the vehicle, in that, a trapezoidal centre of gravity is defined for this vehicle.

FIG. 26 illustrates a side view of the vehicle, in that, a trapezoidal centre of gravity is defined for this vehicle.

In other words, the first coordinate (26a) is at the front axle, second coordinate (26b) is at the swing arm mount, the third coordinate (26c) is at the farthest point on the rider support chassis on the rear side, and a fourth coordinate (26d) is on an imaginary line along a top member of the cargo hold chassis. These four coordinates, when connected, form a trapezoid. The centre of gravity of the frame lies in a region of this trapezoid.

Figure 27:
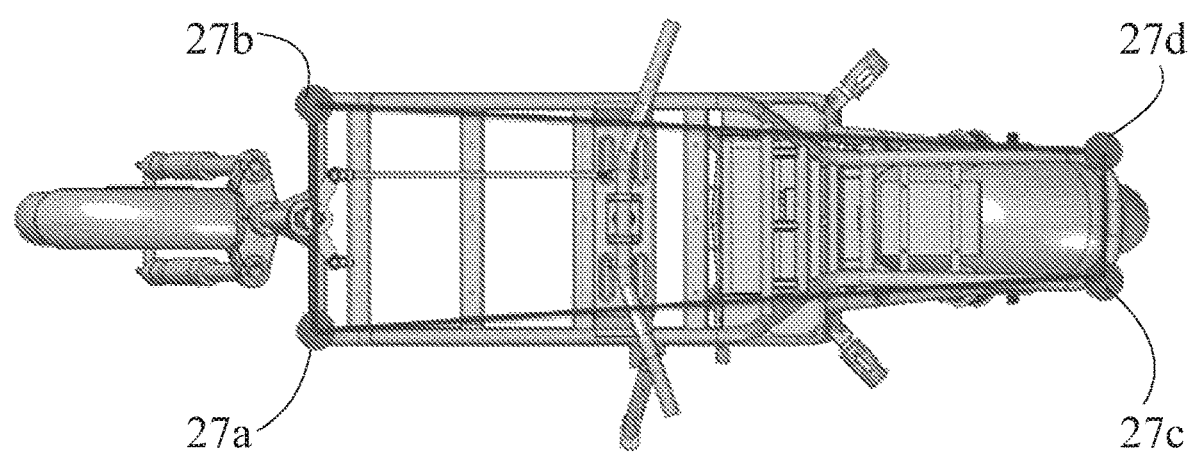
FIG. 27 illustrates a top view of the vehicle, in that, a trapezoidal centre of gravity is defined for this vehicle.

FIG. 27 illustrates a top view of the vehicle, in that, a trapezoidal centre of gravity is defined for this vehicle.

In the top view, the trapezoid centre of gravity coordinates are defined where two points (27a, 27b) are on the front frame members of cargo hold chassis and two points (27c, 27d) on the rear of the rider support chassis.

Figure 28:
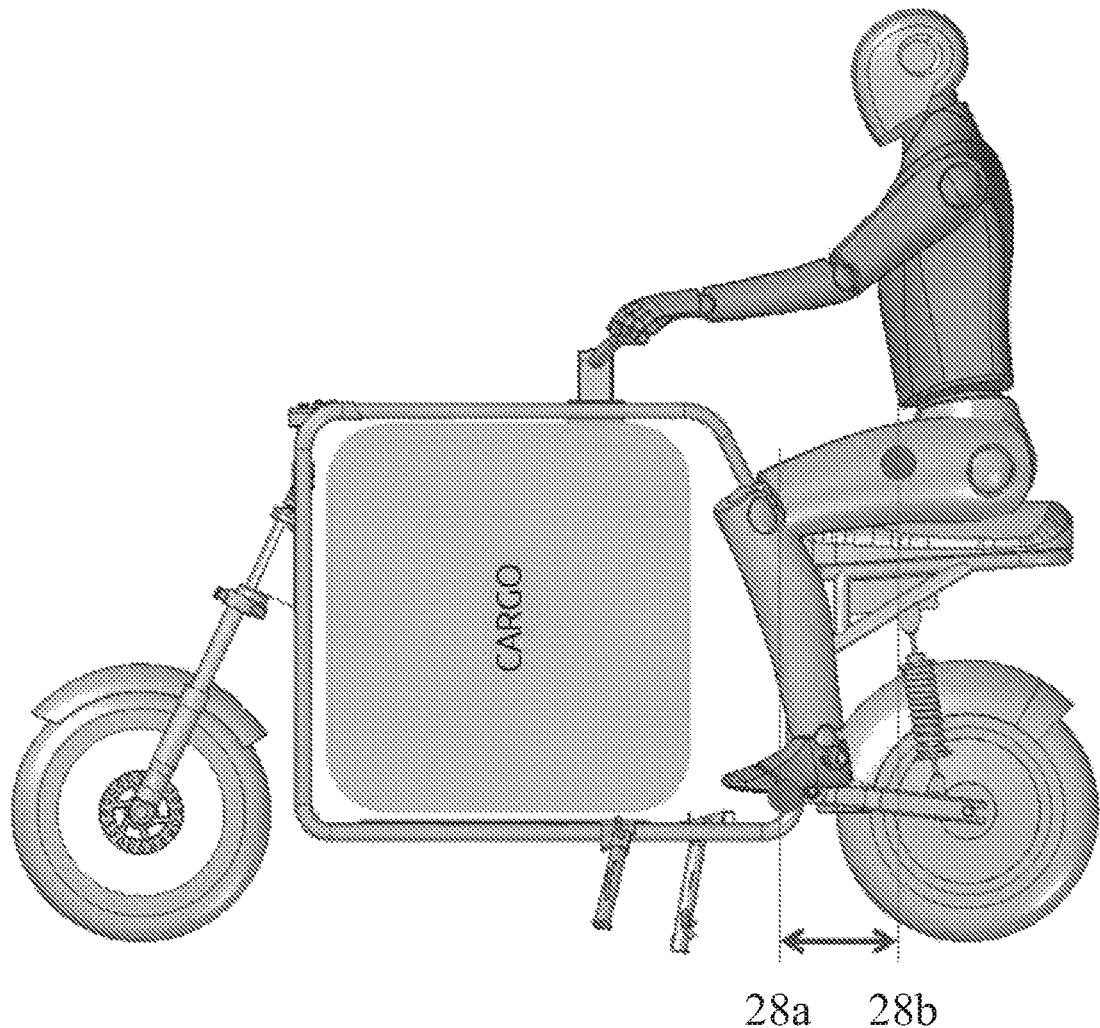
FIG. 28 illustrates a footrest position on the vehicle.

FIG. 28 illustrates a footrest position on the vehicle.

In at least an embodiment, a footrest for a rider to rest their feet is positioned extending from said cargo hold chassis. According to a preferred embodiment, the footrest for said rider is placed operatively ahead or operative behind of said centre of gravity of said rider and is spaced apart horizontally from said centre of gravity of said rider, said spaced apart distance (28a-28b) lies in the range of 0% to 35% of said vehicle's wheelbase length.

It is an object of the invention that the rider's centre of gravity and the cargo's centre of gravity are maintained in the defined triangles on the frame, to maintain a natural balance of the vehicle without deviating from ease of maneuverability. In prior art, there was no provision and defined centre of gravity for either the rider or the cargo or combination of rider and cargo alone or combination or rider and cargo along with battery.

In the absence of a rider seat, the cargo centre of gravity would shift out of the cargo triangle. So, by providing a rider seat higher than a base of the cargo hold chassis and at the rear side of the cargo hold chassis and above the rear axle provides improved chassis balancing. When the vehicle is loaded with cargo and the rider is seated, the cargo load would balance the rider weight and overall vehicle centre of gravity can be maintained at a desired location, which is close to the centre of the wheelbase thereby helping in mass centralization.

Essentially, the vehicle comprises a frame which uses the cargo load for improving the dynamics of the vehicle by reducing centre of gravity of the entire vehicle towards the ground on which it moves, thereby providing a weight balancing frame. Also, this vehicle provides a cargo hold chassis for weight balancing and positioning of centre of gravity substantially between the wheelbase of this vehicle. Additionally, this vehicle provides a substantially large cargo hold area in front of the rider and still provides a steering experience similar to existing two-wheeler vehicles thereby not requiring a new learning curve for riders of this vehicle.

In at least an embodiment, the suspension mechanism of this vehicle is comprised of a group of suspensions selected from a front suspension, a rear suspension, a front and rear suspension, and its combinations. In one embodiment, the front suspension and steering column is mounted on the front side of the cargo hold chassis. In one embodiment, the cargo hold chassis comprises a front suspension which is relatively stiffer than the rear suspension.

In an alternative embodiment, the cargo hold chassis comprises a rear suspension which is relatively stiffer than the front suspension. In one embodiment, the cargo hold chassis is communicably coupled with a front suspension. In one embodiment, the rider support chassis is communicably coupled with a rear suspension.

In at least an embodiment, the cargo hold chassis is an intelligent chassis comprising sensors configured to read tags located on cargo whilst they are being placed and whilst they are being removed. The sensors (providing delivery address details), coupled with a database, and a processing engine defined by a rule engine, and local traffic data and such parameters determines an optimum route for a rider for cargo or portions thereof to be delivered. Other data of the vehicle such as battery life, time of day, fuel, rider preferences, and the like can also be used to determine an optimum or rider-specific ride. In at least an embodiment, this chassis comprises load cells which communicate with a vehicle controller/processor in order to determine speed of the vehicle based on the loading inside the cargo hold space. It may also consider other parameters such as maximize the range for the given battery capacity, remaining charge, life of the battery, and the like. Further, data from the load cells may also aid in determining starting torque.

In yet other embodiment a main stand and a side stand are positioned in the rear half of the cargo hold chassis. The main stand and the side stand are operatively positioned between the imaginary line passing through the centre of wheelbase and rear axle. The positioning of the stand at the location assists in easy accessibility and operation of the side and main stand.

The TECHNICAL ADVANCEMENT of this invention lies in providing a cargo-carrying wheeled vehicle comprised of a cargo hold chassis and rider support chassis wherein, addition of cargo and a rider actively assists in maintaining the centre of gravity of the vehicle, especially after addition of cargo and rider, relatively lower (closer to ground) and substantially on or very near to the centerline of the wheelbase of this vehicle. Once the vehicle is loaded, the vehicle is more stable because CG is low—while turning, the vehicle and load assists itself in turning with minimal user input.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

What is claimed is:

1. A cargo-carrying wheeled vehicle, said vehicle comprising:
   at least a cargo hold chassis (10);
   at least a rider support chassis (20) configured to be operatively behind said cargo hold chassis (10), in that, said cargo hold chassis (10) and said rider support chassis (20) cooperate to maintain centre of gravity of said vehicle, after addition of cargo to said cargo hold chassis (10) and after addition of rider to said rider support chassis (20), to obtain a naturally balanced position for said vehicle in a loaded as well as an unloaded condition,
   a back lateral support member of said cargo hold chassis and a front lateral support member of said rider support chassis;
   wherein the back lateral support member of said cargo hold chassis and the front lateral support member of said rider support chassis is a single same member;
   wherein, an operative horizontal spaced apart distance between a centre of gravity of cargo in said cargo hold chassis and a centre of gravity of a rider on said rider support chassis is defined by a first locus of points which lie within two tenths of a wheelbase length and eight tenths of said wheelbase length;
   wherein, a combined centre of gravity being formed by a centre of gravity of said cargo in said cargo hold chassis, a centre of gravity of said cargo hold chassis, a centre of gravity of said rider on said rider support chassis, and a centre of gravity of said rider support chassis, wherein,
   said combined centre of gravity being defined by a second locus of points, on an operative horizontal axis of said vehicle, which lie within a first value and a second value, said first value being a tolerance range of one fourth times the wheelbase length added to half the wheelbase length, said second value being a tolerance range of one fourth times the wheelbase length subtracted from half the wheelbase length; and
   said combined centre of gravity being defined by a third locus of points, on an operative vertical axis of said vehicle, which lie within a third value and a fourth value, said third value being defined by radius of a wheel of said vehicle, said fourth value being defined by radius of a wheel of said vehicle added to a tolerance value of one third the wheelbase length.

2. The vehicle as claimed in claim 1, further comprising:
   a footrest for a rider to rest their feet being positioned extending from said cargo hold chassis,
   wherein, the footrest for said rider is placed operatively ahead or behind the said centre of gravity of said rider and is spaced apart horizontally from said centre of gravity of said rider, said spaced apart distance lying in the range of 0% to 35% of said vehicle's wheelbase length.

3. The vehicle as claimed in claim 1, wherein:
said cargo hold chassis (10) being integral with said rider support chassis (20);
said cargo hold chassis (10) being located operatively forward and operatively lower with respect to said rider support chassis (20), or operatively rearward with respect to said cargo hold chassis.

4. The vehicle as claimed in claim 1, wherein said cargo hold chassis (10) comprising at least a lateral support member along with an operative top support member and an operative bottom support member to form a contoured space to hold cargo, wherein, the operative top support member of said cargo hold chassis is greater than in length than a top support member of said rider support chassis.

5. The vehicle as claimed in claim 1, wherein said cargo hold chassis is communicably coupled with a front wheel (10a) or a front set of wheels, and said rider support chassis is communicably coupled with a rear wheel (12a) or a rear set of wheels, the rear wheel is located on a rear axle.

6. The vehicle as claimed in claim 1, wherein said rider support chassis comprises at least a lateral support member, along with an operative top support member and an operative bottom support member to form a contoured framework to hold a rider on its top support member,
wherein the operative top support member is located at a height such that the rider, when seated, has his/her individual centre of gravity operatively higher than the individual centre of gravity of cargo load.

7. The vehicle as claimed in claim 1, wherein centre of gravity of said vehicle lies in proximity to centre of the wheelbase of the vehicle, and
wherein addition of load in said cargo hold chassis decreases height of centre of gravity of said vehicle; thereby, improving handling and dynamics of said vehicle, while in motion.

8. The vehicle as claimed in claim 1 wherein, an operative front wheel of said vehicle is relatively smaller than an operative rear wheel of said vehicle, thereby making said chassis forward bias, thereby increasing weight on said front wheel when cargo is loaded onto said cargo hold chassis which is counterbalanced by the rider load, thereby helping in mass centralization.

9. The vehicle as claimed in claim 1 further comprising a gyroscope located at the base of said cargo hold chassis to improve handling of the vehicle.

10. The vehicle as claimed in claim 1, wherein said cargo hold chassis being designed to maintain centre of gravity of said vehicle along with said vehicle in a pre-defined zone, in that, front axle weight ≥25% but ≤75% of total vehicle weight while corresponding rear axle weight ≥25% but ≤75% of total vehicle weight.

11. The vehicle as claimed in claim 1 wherein, said cargo hold chassis comprises two steering columns, comprising a first steering column and a second steering column, in its operative front, in that a first steering column defines a rake angle of a front suspension and a second steering column is for translation of steering input to a triple tree.

12. The vehicle as claimed in claim 1 further comprising:
one or more swing arm pivots on said cargo hold chassis for mounting a swing arm and at least one mounting location for the suspension mounts;
a handlebar on said vehicle located longitudinally spaced apart from the steering axis.

13. The vehicle as claimed in claim 12, wherein, said cargo hold chassis comprises a cargo triangle, where centre of gravity of cargo lies in said cargo triangle, said cargo triangle is defined by a first point obtained by an intersection of a first axis line, of a first steering column, with a second axis line, of a second steering column, and a second point and a third point; each of said second point and said third point being obtained at extremities of a line defined by a front axle and one of the swing arm pivots in rear.

14. The vehicle as claimed in claim 12 wherein, said cargo hold chassis comprises a rider's triangle, where a rider's centre of gravity lies in said rider triangle, said rider's triangle is defined by a first point obtained by an intersection of a first axis line, of a first steering column, with a second axis line, of a second steering column, a second point obtained by one of the swing arm pivots, and a third point obtained on an imaginary line perpendicular to ground, on which said vehicle is located, and passing through the rear axle.

15. The vehicle as claimed in claim 12 wherein, said cargo hold chassis comprises a frame's triangle, where a frame's centre of gravity lies in said frame's triangle, said frame's triangle is defined by a first point obtained on an operative vertical axis line of the handlebar, a second point on a ground and being the other extremity of the same operative vertical axis line of said steering assembly's handlebar, and a third point being the rearmost extremity of said rider support chassis.

16. The vehicle as claimed in claim 1 wherein, said vehicle's centre of gravity is defined by a trapezoid wherein said cargo triangle and said rider triangle form a trapezoid.

17. The vehicle as claimed in claim 1 wherein, said vehicle's centre of gravity is defined by a trapezoid wherein a first coordinate is at a front axle of said vehicle, a second coordinate is at one of the swing arm pivots of said vehicle, a third coordinate is at the farthest point on said rider support chassis on the rear side of said vehicle, and a fourth coordinate is on an imaginary line along a top member of said cargo hold chassis of said vehicle.

18. The vehicle as claimed in claim 1 wherein, said vehicle's centre of gravity is defined by a trapezoid wherein trapezoid centre of gravity coordinates are defined where two points are on the front frame members of cargo hold chassis and two points on the rearmost part of the rider support chassis.

19. The vehicle as claimed in claim 1, further comprising:
a main stand and side stand of said vehicle being positioned in an operative rear part of said cargo hold chassis and between an imaginary line passing through a centre of said wheelbase and a rear axle.

* * * * *